(12) United States Patent
Recktenwald et al.

(10) Patent No.: US 6,439,345 B1
(45) Date of Patent: Aug. 27, 2002

(54) ITEM PICK-UP SYSTEM

(75) Inventors: Patricia A. Recktenwald, Naperville; James M. Brabson, Woodridge; Michael E. LeRoy, Algonquin; Frank J. Lopuszynski, Crystal Lake; Anthony J. Fernandes, Villa Park; Terrance L. McGinnis, Crystal Lake; Paul J. Wasson; Philip L. Thacher, both of Lake in the Hills, all of IL (US)

(73) Assignee: Sears, Roebuck and Co., Hoffman Estates, IL (US)

( * ) Notice: Subject to any disclaimer, the term of this patent is extended or adjusted under 35 U.S.C. 154(b) by 854 days.

(21) Appl. No.: 08/651,630

(22) Filed: May 22, 1996

(51) Int. Cl.⁷ .................................................. A47F 9/00
(52) U.S. Cl. ............................. 186/55; 235/383; 705/18
(58) Field of Search ........................... 186/53, 55, 56, 186/52, 41, 39; 235/383; 340/825.35; 364/479.07; 395/226, 227; 194/205, 210, 217

(56) References Cited

U.S. PATENT DOCUMENTS

| | | | |
|---|---|---|---|
| 3,339,671 A | 9/1967 | Simjian | 186/56 |
| 3,420,336 A | 1/1969 | Simjian | 186/56 |
| 3,741,345 A | 6/1973 | Saridis | 186/55 |
| 3,824,544 A | 7/1974 | Simjian | 340/147 |
| 4,569,421 A * | 2/1986 | Sandstedt | 186/39 |
| 4,645,036 A | 2/1987 | Nestler | 186/55 |
| 4,803,348 A * | 2/1989 | Lohrey et al. | 235/381 |
| 4,947,028 A * | 8/1990 | Gorog | 235/383 X |
| 5,013,896 A * | 5/1991 | Ono et al. | 235/383 X |
| 5,154,260 A | 10/1992 | Patel | 186/55 |
| 5,158,155 A | 10/1992 | Domain et al. | 186/53 |
| 5,183,142 A * | 2/1993 | Latchinian et al. | 186/56 X |
| 5,186,281 A | 2/1993 | Jenkins | 186/55 |
| 5,245,163 A * | 9/1993 | Yehuda | 235/383 X |
| 5,361,871 A | 11/1994 | Gupta et al. | 186/61 |
| 5,431,250 A * | 7/1995 | Schlamp | 186/55 |
| 5,482,139 A * | 1/1996 | Rivalto | 235/383 X |

* cited by examiner

*Primary Examiner*—F. J. Bartuska
(74) *Attorney, Agent, or Firm*—Marshall, Gerstein, & Borun

(57) ABSTRACT

An item processing kiosk is located in or near a pickup area and (i) displays selections allowing a customer to choose whether the customer is picking up or dropping off an item (ii) in response to the customer selecting one of the displayed selections, displays a request for the customer to enter a customer and item identification, and (iii) in response to the customer entering the customer and item identification, electronically transmits a message to a remote stock room terminal. The message designates whether an it is to be picked up or dropped off. The message is arranged to cause the stock room terminal to identify the customer and the item. A stock room attendant picks up the item from, or delivers the item to, the customer, as appropriate.

52 Claims, 43 Drawing Sheets

FIGURE 9
We are having problems with your request
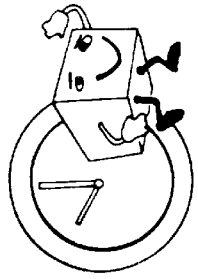
If you think you may have made a mistake in entering your information, touch the "Go Back" button.
If you're done, touch the "OK" button to let the next person in line use this system.
Or, if you need further assistance touch the "Help" button to page a sales associate.
OK
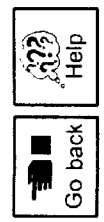
Help / Go back

Do you need More Time ?

FIGURE 13

Thank you for using Merchandise Pick-Up
Please wait while we retrieve your merchandise

1300

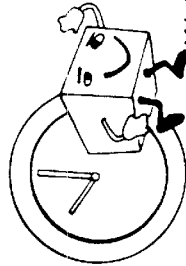
We're getting the following items for you:

3DR CABINET,;5DR CABINET,;

-Your merchandise will be brought out shortly.
-Please get your car ready and come back to the waiting room.

-Then, watch for your name on the TV screen behind you.

-Touch the "OK" button so the next person can use Merchandise Pick-Up.

OK

FIGURE 21

Problem Description for DRILL

Select "Yes" for the descriptions that best fit your problem; then touch "OK"

|  | Won't Run | Vibrates/Noisy | Speed Control | Switch Lock | Gets too hot |
|---|---|---|---|---|---|
| Yes | ✓ | ☐ | ☐ | ☐ | ☐ |
| No | ☐ | ✗ | ✗ | ✗ | ✗ |

OK

Menu

Help

Go back

2100

FIGURE 24
Is the item under warranty or a service contract ?
Touch the button that describes which you have
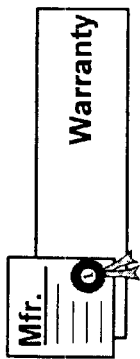
Warranty
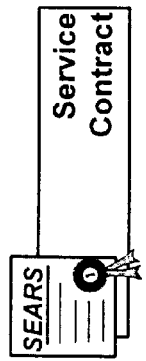
Service Contract
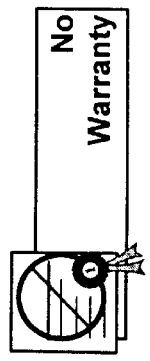
No Warranty
Go back
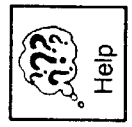
Help
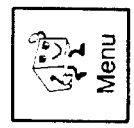
Menu
2400

FIGURE 26
There's only one item for pickup by JOE SMITH
Touch "Yes" if you wish to pickup this item, or touch "No" if there's a problem
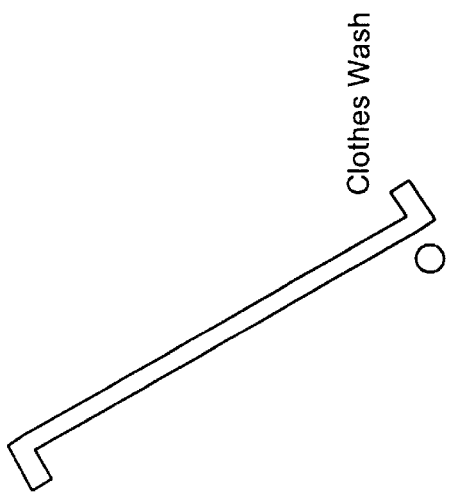
Clothes Wash
Touch "No" if there's a problem with the item listed
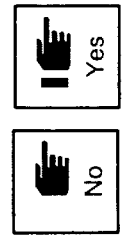

FIGURE 27
What would you like to do ?
Touch the item that describes what you want to do
Loaner Pickup
Loaner Return
2700
 Go back
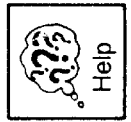 Help
 Menu

ITEM PICK-UP SYSTEM

TECHNICAL FIELD OF THE INVENTION

The present invention relates to a system, including a kiosk and associated apparatus, which may be used by a customer for the pick up and/or drop off of items.

BACKGROUND OF THE INVENTION

Many sales by retail sales establishments involve merchandise which cannot or will not be given to the customer at the time of purchase. For example, if the merchandise purchased by the customer is not currently on the floor of the retail sales establishment but is instead in a stock room, the customer must proceed from the point of sale within the retail sales establishment to a pick up area, usually near a stock room, in order to pick up the purchased merchandise. In other cases, the customer may choose to pick up the merchandise at some later time, such as after the customer has finished other shopping. In still other cases, the merchandise purchased by the customer may not be available either on the sales floor or in a stock room, but must be ordered by the retail sales establishment for later pick up by the customer.

In such circumstances, it is current practice for the customer to make a pick up request to an attendant of the retail sales establishment who attends a pick up register located in a pick up area which is normally proximate to a stock room in which merchandise is staged or stored. This pick up register typically presents the register attendant with a main menu screen display which offers the register attendant a choice of options. These options include, inter alia, a purchase option, a pick up option, a return option, and a sales transaction cancellation option.

Assuming that the customer is to pick up a package purchased earlier, the register attendant selects the pick up option. In response to this selection, the register attendant is then presented with a screen display requesting the register attendant to enter the attendant's ID. Following entry of the attendant's ID, a pickup menu is presented to the register attendant who must select from among several displayed options. These options include a "hold for merchandise" (HFM) option, a service/repair option, a loaner option, and the like. The hold for merchandise (HFM) option is used if the customer wishes to pick up earlier purchased merchandise. The service/repair option is used if the customer wishes either to drop off merchandise to be serviced and/or repaired or to pick up merchandise that has been serviced and/or repaired. The loaner option is used if the customer wishes to pick up or drop off (return) a loaner. (A loaner is merchandise which is to be, or has been, loaned to a customer.)

If the register attendant selects the hold for merchandise (HFM) option, the register attendant is next presented with a screen display requiring the register attendant to identify the customer either (i) by entering the sales check number of the sales check covering the merchandise to be picked up (if the customer has possession of the sales check), (ii) by swiping or manually entering the customer's credit card, or (iii) by searching for the identification of the customer and the merchandise to be picked up by other procedures such as by manually entering the customer's name, telephone number, and/or the like. Assuming that the customer is identified according to the sales check number, the pick up register presents to the register attendant a screen display containing the relevant sales check information. This information contains, for example, one or more items of merchandise which were purchased by the customer. Items which are displayed, but which have not been previously picked up, may be selected. The register attendant is requested to select one or more of the displayed items of merchandise, and the register attendant then presses the total key. A receipt for the selected merchandise is printed, and this receipt is given to a stock room attendant who pulls the selected merchandise and delivers it to the customer.

If the register attendant selects the loaner option instead of the hold for merchandise (HFM) option displayed by the pickup menu, the register attendant is required by the pick up register to indicate whether the loaner is o be picked up or dropped off (returned), to indicate whether the loaner is to be released directly from the sales floor or by a stock room attendant, and to enter an identification of the customer. Upon entering the identification of the customer, the pick up register presents the register attendant with a customer information screen display asking the register attendant to either change the displayed customer identification information, as appropriate, or to verify that the customer identification information is accurate. This customer information may include, for example, the customer's name, address, and telephone number. Thereafter, the register attendant is requested to enter the division and stock number of the loaner item. The pickup register then presents the register attendant with the price of the loaner item and permits the register attendant to modify the price, if appropriate. After all other loaners, if any, have been similarly processed, the register attendant is requested to indicate the reason for the loan and to enter the customer's identification (which may include, for example, a plurality of alpha/numeric characters). The pick up register also permits the register attendant to enter comments.

A similar procedure is implemented in conjunction with the pick up register regarding merchandise to be serviced and or repaired.

If the register attendant selects the return option instead of the pick up option from the main menu, the register attendant is likewise requested to supply the registers attendant's ID, to select the type of return (there may be returns which require special handling), and to identify the customer using one of the identification modes discussed above. For example, the customer may be identified by entering the sales check number covering the item to be returned. Upon identification of the customer, a screen display appears on the pick up register presenting one or more items of merchandise covered by the pertinent sales check. The register attendant then selects one or more of the displayed items. A screen display then is presented by the pick up register requiring the register attendant to indicate whether the merchandise to be returned is to be returned to the sales floor, whether it is to be reticketed or repackaged, whether it is salable at a reduced price, and so on. Following an appropriate selection, the register attendant is requested to insert a two-piece tag into the pick up register, and the pick up register prints appropriate information on the tag. The register attendant is then instructed by a display on the pick up register to remove the tag from the pick up terminal. The register attendant affixes the tag to the returned merchandise for identification and disposition purposes. If this transaction involves an exchange, the register attendant is required to ring up the new item for which the returned item is to be exchanged. On the other hand, if this transaction involves a refund, the register attendant is required to process a refund.

As can be seen from the above description, the current practice involving the pick up, return, or loan of merchandise involves a substantial effort on the part of the retail sales establishment in processing and completing the transaction.

The present invention is directed towards an arrangement for simplifying and reducing the effort on the part of a retail sales establishment involved in the pick up and drop off of merchandise.

SUMMARY OF THE INVENTION

In accordance with one aspect of the present invention, an item pick up system comprises a communication channel and first, second, and third means. The first means is connected to the communication channel. The first means issues a check identifying both a person who is to receive an item and the item to be picked up by the person. The second means is connected to the communication channel and is located remotely from the first means. The second means identifies the person and item, and transmits a message identifying the person and the item. The third means is connected to the communication channel and is located remotely from the first and second means. The third means receives the message and provides an indication of the person and item in an item holding area.

In accordance with another aspect of the present invention, an item pick up system comprises a point-of-sale terminal, a pick up terminal, and a stock room terminal. The point-of-sale terminal is located remotely from a stock room and a pick up area, and the point-of-sale terminal is arranged to process a point of sale transaction during which an item is purchased by a customer. The pick up terminal is located in the pick up area and outside the stock room. The pick up terminal is arranged to receive data directly from the customer, to identify the customer and the item from the data, and to transmit a message identifying the customer and the item. The stock room terminal is coupled to the point-of-sale terminal and to the pick up terminal and is located in or near the stock room and outside the pick up area. The stock room terminal is arranged to notify, in response to the message, a stock room attendant in the stock room of the item and of the customer to be given the item.

In accordance with still another aspect of the present invention, an item processing kiosk comprises a customer identifying means and a message transmitting means. The customer identifying means, in response to data supplied directly by the customer, identifies the customer and the item to be picked up by the customer. The message transmitting means electronically transmits a message in response to the customer identifying means. The message provides a notification of the customer and the item.

In accordance with yet another aspect of the present invention, an item processing method performed by a kiosk comprises the following steps: a) displaying selections allowing a customer to choose whether the customer is picking up an item or dropping off an item; b) in response to the customer selecting one of the displayed selections, displaying a request for the customer to enter a customer and item identification; and c) in response to the customer entering the customer and item identification, electronically transmitting a message, the message being arranged to provide a notification of the customer and the item, wherein the message designates whether an item is to be picked up or an item is to be dropped off.

BRIEF DESCRIPTION OF THE DRAWINGS

These and other features and advantages will become more apparent from a detailed consideration of the invention when taken in conjunction with the drawings in which:

FIGS. 3–27 are screen displays presented by the MPU kiosk illustrated in FIG. 1; and, FIGS. 28–36 illustrate flow charts relating to a program executed by the item pick up system of the present invention.

DETAILED DESCRIPTION

Figure 1:
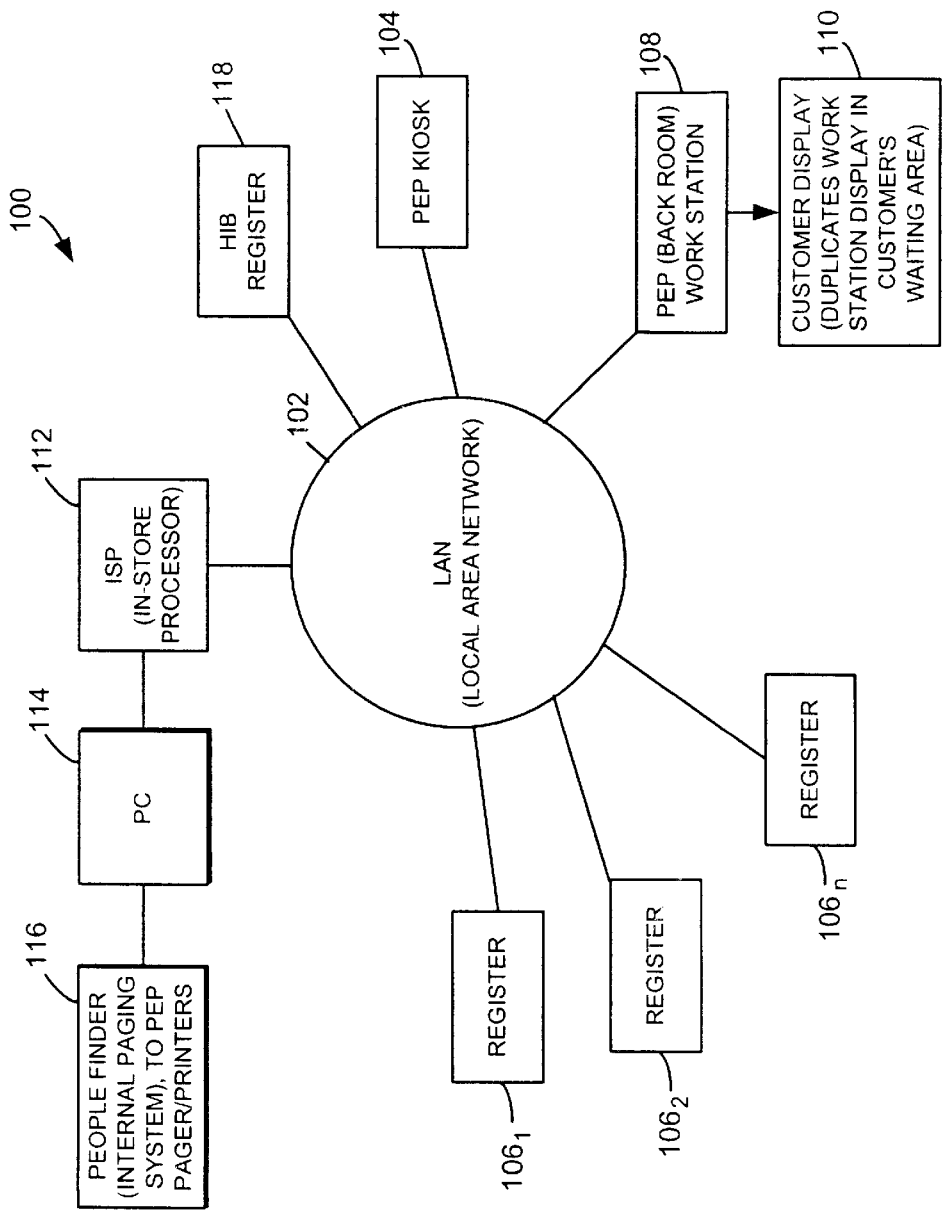
FIG. 1 is a schematic diagram of the item pick up system according to the present invention.

An item pick up system 100, which implements the present invention, is illustrated in FIG. 1. The item pick up system 100 includes a communication channel 102 which may support a token ring protocol, although any other type of protocol can be used. Connected to the communication channel 102 is an MPU kiosk 104 which may be located in a merchandise pick up area near a stock room or other item holding area or in any other suitable location accessible by customers who wish to pick up items, to drop off items, or the like. Also connected to the communication channel 102 are a plurality of point-of-sale registers $106_1, 106_2 \ldots 106_n$. These point-of-sale registers $106_1$–$106_n$ may be distributed throughout a sales floor of the retail sales establishment in which the item pick up system 100 is used. Accordingly, the point-of-sale registers $106_1$–$106_n$ are usually located remotely from the MPU kiosk 104.

A work station 108 is provided in a stock room or other holding area which may be located near, but not in, the merchandise pick up area. The work station 108, accordingly, is located remotely from both the MPU kiosk 104 and the point-of-sale registers $106_1$–$106_n$. The work station 108 is connected to the communication channel 102 and is also connected to a customer display 110 which may be located anywhere where it may be viewed by customers who are in the process of picking up items. For example, the customer display 110 may be located near the MPU kiosk 104 or may be located in a customer waiting room. Alternatively, the customer display 110 may be located in the stock room or holding area and may be viewable by the customer through a suitable window. The customer display 110 may have Waiting and Now-Serving sections. The Waiting section indicates that the customer is waiting for an MPU associate to appropriately respond to the customer's transaction. The Now-Serving section indicates that the MPU associate is appropriately processing the customer's transaction.

The item pick up system 100 permits a customer, or other non-employee person acting for the customer, such as a relative or friend, to pick up an item purchased at one of the point-of-sale registers $106_1$–$106_n$ when the item is not available on the sales floor or when the customer must, or wishes to, pick up the item at a later time. At the time of pick up, the customer uses the MPU kiosk 104 to indicate readiness to pick up the purchased item. The MPU kiosk 104 then transmits a message over the communication channel 102 to the work station 108 located in the stock room. This message contains information indicating that the customer is waiting for the purchased item. The work station 108, in response to this message, displays to a stock room attendant both the identity of the customer and the item that the customer wishes to pick up. Hereinafter, the stock room attendant is referred to as an MPU associate. Alternatively or additionally, as will be discussed hereinafter, the message from the MPU kiosk 104 may cause a signal to be transmitted to a portable display device (such as a pager or a printer) worn or carried by the MPU associate such that the portable display device, in response to the signal, displays an item to be picked up and the identification of the customer who is to pick up the item. The MPU associate then locates the item and delivers the item to the identified customer. The item pick up system 100 may also be used for other transactions such as repairs and servicing, loaner pick up and drop off, returns and exchanges, and the like.

An in-store processor 112 has a database including an HFM database and a name and address database. The HFM database contains all of the store's transactions (including purchases, loans, returns, repairs, servicing, and the like) covering a predetermined amount of time, such as a year. The name and address database contains identifications of customers who have transacted business with, or have accounts at, the retail sales establishment. The in-store processor 112 may have other databases as well. The in-store processor 112 performs functions related to the item pick up system 100 as well as functions unrelated to the item pick up system 100. The in-store processor 112 may be connected to a computer 114 which in turn is connected to a paging system 116. The paging system 116 may transmit a message by RF transmission over the air, by the communication channel 102, by voice over speakers, or the like. The paging system 116, when activated, transmits a message to the portable display device worn or carried by the MPU associate. A hub register 118 is also connected to the communication channel 102. The hub register 118 is a terminal accessible by any terminal on the communication channel 102. The hub register 118 may be located in a hub area of the retail sales establishment, and may be used as an interface to any other terminal, including the in-store processor 112.

Figure 2:
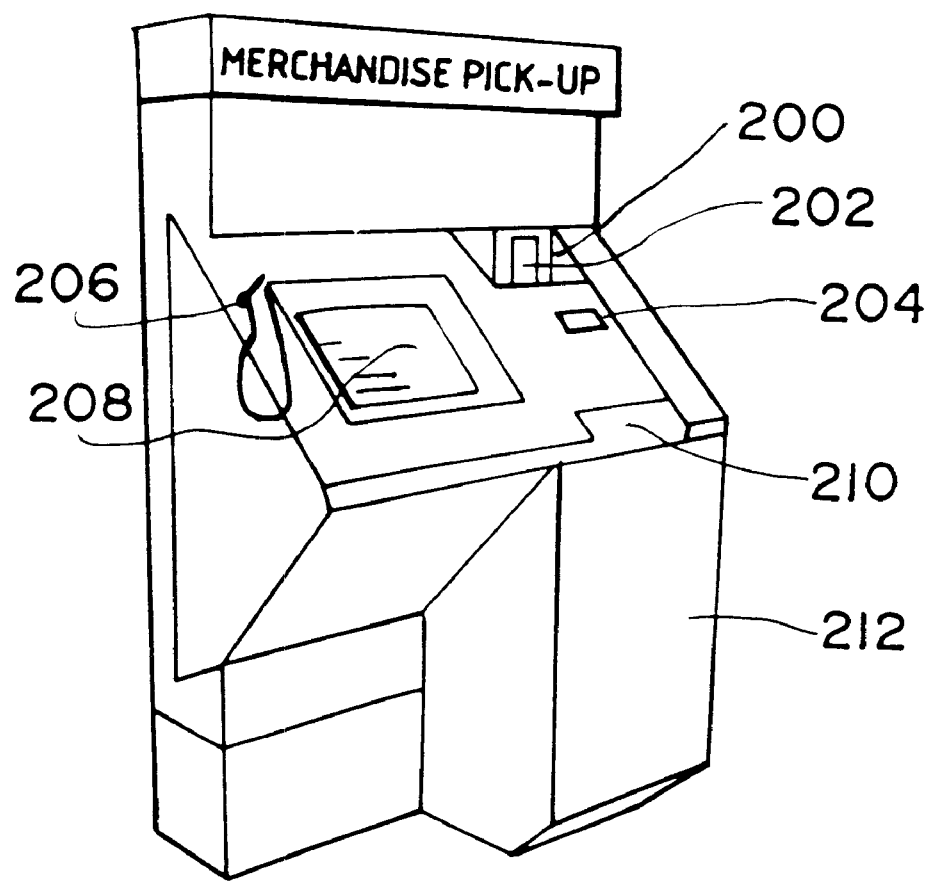
FIG. 2 is a perspective view of a merchandise pick up (MPU) kiosk used in the item pick up system shown in FIG. 1.

An example of the MPU kiosk 104 is shown in FIG. 2. The MPU kiosk 104 includes a bar code scanner 200, a magnetic stripe reader 202, a cash receptor 204, a stylus 206, a touch screen monitor 208, a printer slot 210, and a cabinet 212 containing a computer, a printer, and other support devices including a modem or other device for connecting the MPU kiosk 104 to the communication channel 102.

Upon completion of a sale at one of the point-of-sale registers $106_1$–$106_n$ involving an item to be picked up by the customer, the point-of-sale register $106_1$–$106_n$ prints a sales check containing a bar code. The sales check is given by the sales register attendant to the customer. Also, the point-of-sale register $106_1$–$106_n$ transmits a message over the communication channel 102. This message contains identifying information equivalent to the bar code on the sales check. The message also contains the customer's name, the item that was purchased, the original location of the item, and where the item is to be placed. (For example, the item may be staged for same day pick up, or it may be placed in a bin for pick up scheduled on a later day.) The in-store processor 112 stores the information contained in this message in a database, and the work station 108 prints a tag with this information in response to this message. This tag is placed by the MPU associate on the item to be picked up by the customer, and the MPU associate places the item in a staging area for same date pick up or in a bin for pick up on a later day.

When a customer approaches the MPU kiosk 104, a welcome screen display (not shown) is presented to the customer on the touch screen monitor 208. This welcome screen display may inform the customer of the name of the retail sales establishment and may also display certain products offered by the retail sales establishment. The products displayed in this welcome screen display may be fixed or may change periodically such as every few seconds in order to present the customer with graphical displays of a wide variety of products offered by the retail sales establishment. Finally, the welcome screen display includes a start area or icon which can be touched by the customer to start a transaction. Touch sensitive areas of the touch screen monitor 208 are referred to hereinafter as buttons. Also, the start area of the welcome screen display may be in the form of a "YES" button, an "OK" button, a "START" button, or the like. Alternatively, instead of a start area or icon, any touch of the touch screen monitor 208, a scanning of a receipt, or any other mechanism may be used to start a transaction.

Figure 3:
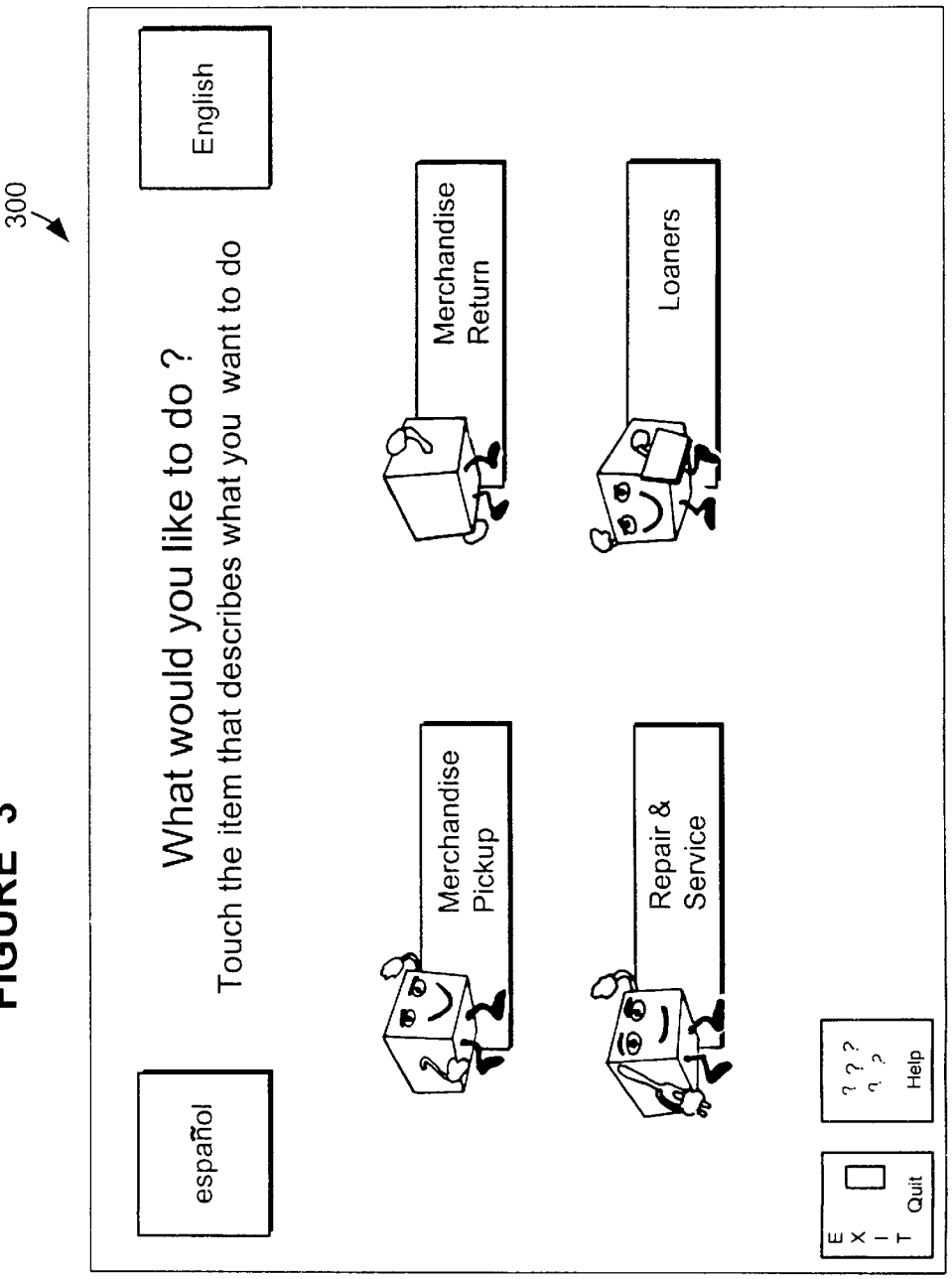

Upon touching the start area on the welcome screen display presented on the touch screen monitor 208, the customer is presented with a screen display 300 as shown in FIG. 3. The screen display 300 contains a main menu which permits the customer to select from among four major options of the item pick up system 100. By touching an appropriate button on the screen display 300, the customer may initiate a pick up transaction, a repair and service transaction, a return transaction, or a loaner transaction. In addition, the screen display 300 includes language selection buttons, a Quit button which, if touched, returns the customer to the welcome screen display, and a Help button which may be touched for information about the screen display 300. Upon touching one of the language buttons, all subsequent screen displays, including the screen display 300, which are presented to that customer, appear in the chosen language.

Figure 4:
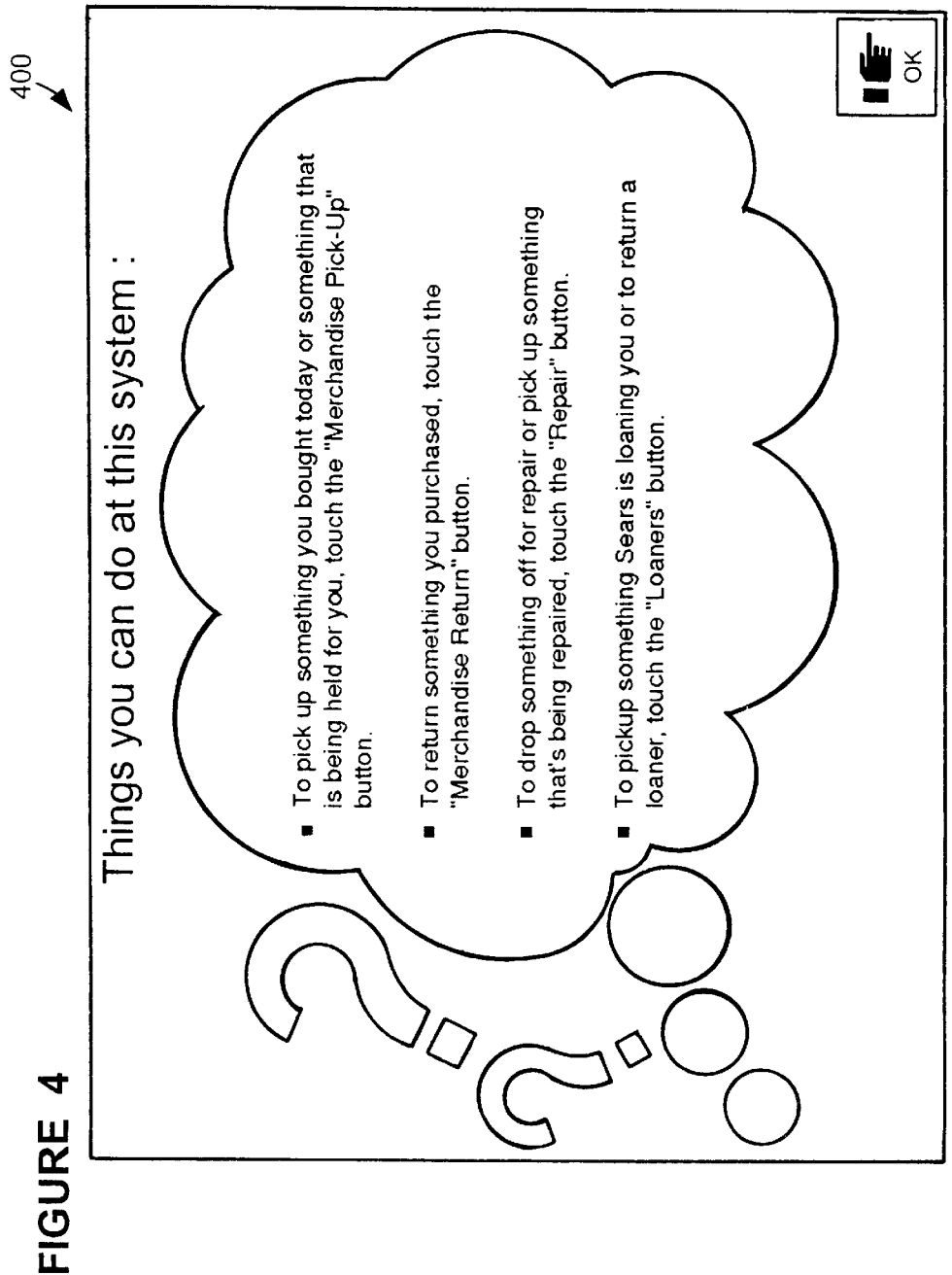

If the customer touches the touch screen monitor 208 over the Help button of the screen display 300, a screen display 400 as shown in FIG. 4 is presented to the customer. As illustrated in FIG. 4, the screen display 400 assumes that the Customer wishes all screen displays to be presented in English. If the customer had chosen Spanish from the screen display 300, however, the screen display 400 would have been presented in Spanish.

Help messages, such as contained in the screen display 400 illustrated in FIG. 4, are available throughout the customer's movement through the various screen displays of the MPU kiosk 104. Touching a Help button of a screen display presents information to the customer concerning that screen display. Accordingly, as shown by the screen display 400, the customer is presented with information about how to use the screen display 300. The screen display 400 includes an OK button which, when touched, returns the customer to the screen display 300. There are some instances, however, where touching a Help button, instead of providing a customer with information about the current screen display, allows the customer to request help from an employee of the retail sales establishment. Examples of these instances will be discussed below.

Figure 5:
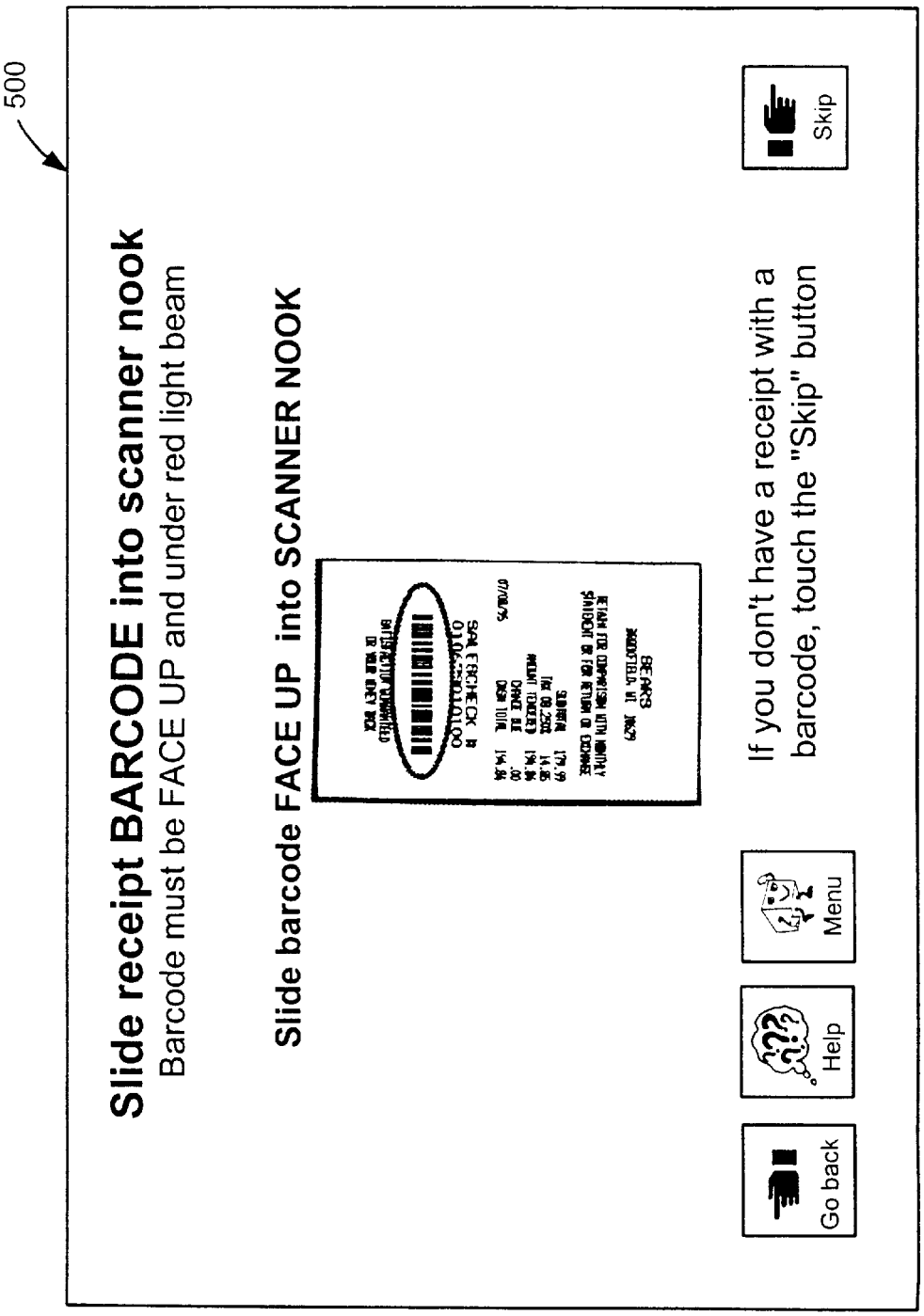

If the customer touches the Merchandise Pickup button of the screen display 300, a screen display 500 shown in FIG. 5 is presented to the customer on the touch screen monitor 208. The screen display 500 begins the process of identifying the customer and the item to be picked up. There are four ways to search the database of the in-store processor 112 for a customer's transaction. First, the customer may use the bar code scanner 200 of the MPU kiosk 104 in order to scan a bar code from the sales check which was presented to the customer by a point-of-sale register attendant at the time that the customer purchased the item to be picked up. Second, the customer may enter the customer's telephone number by touching appropriate buttons on the touch screen monitor 208. Third, the customer may enter the customer's name by touching appropriate buttons on the touch screen monitor 208. Fourth, the customer may manually enter the customer's sales check number by touching selected buttons on the touch screen monitor 208. Different or additional ways to search the name and address database of the in-store processor 112 may be implemented.

If the customer elects to initiate a search by scanning the bar code on the sales check or by manually entering the customer's sales check number, the HFM database is directly searched on the basis of the sales check number. However, if the customer elects to initiate a search by entering the customer's telephone number or name, the name and address database is first searched in order to verify the customer's identity, the customer is then requested to confirm the identity, and finally the HFM database is searched on the basis of the customer's identity.

Each item which is found in the HFM database as a result of the search and which is available for pick up is displayed on the touch screen monitor 208.

Accordingly, the screen display 500 directs the customer to slide a sales check bearing the bar code through the bar code scanner 200, and indicates the proper orientation of the sales check as the sales check is slid through the bar code scanner 200 during this process. If the customer properly slides a sales check through the bar code scanner 200, the MPU kiosk 104 transmits the information included in the scanned bar code to the in-store processor 112 which searches the HFM database for all items that are covered by the sales check and that have not yet been picked up by the customer. If the customer chooses to use an alternative identification method, the customer touches the Skip button on the screen display 500. Touching the Menu button returns the customer to the main menu contained in the screen display 300, and touching the Go back button returns the customer to the previous screen display.

Figure 6:
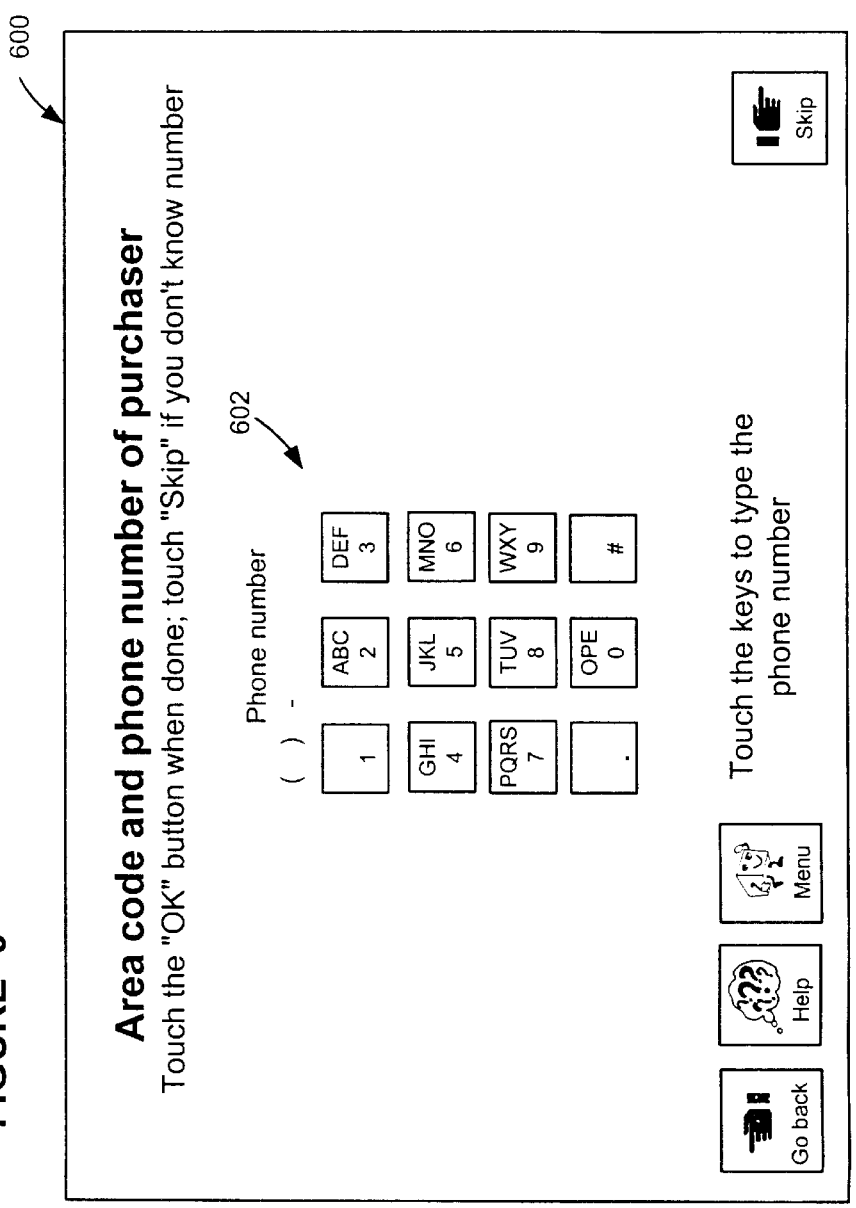

If the Skip button on the screen display 500 is touched, a screen display 600 as shown in FIG. 6 is presented to the customer. The screen display 600 replicates the button pad of a touch tone telephone. By touching the buttons on the screen display 600, the customer may enter the customer's telephone number. As the buttons are touched, the telephone number of the customer appears in a region 602 of the screen display 600 and an OK button appears beside the Skip button. The telephone number is the identification for the customer whose customer identification is stored in the name and address database of the in-store processor 112. When the OK button is touched after the customer's telephone number is fully entered, the MPU kiosk 104 transmits the telephone number to the in-store processor 112 which searches the name and address database for the identity of the customer. If the customer is identified, the in-store processor 112 searches the HFM database for any transactions involving items which the customer has not yet picked up. Instead of telephone numbers, other forms of ID may be used. If the customer chooses to use an alternative identification method, the customer touches the Skip button on the screen display 600.

Figure 7:
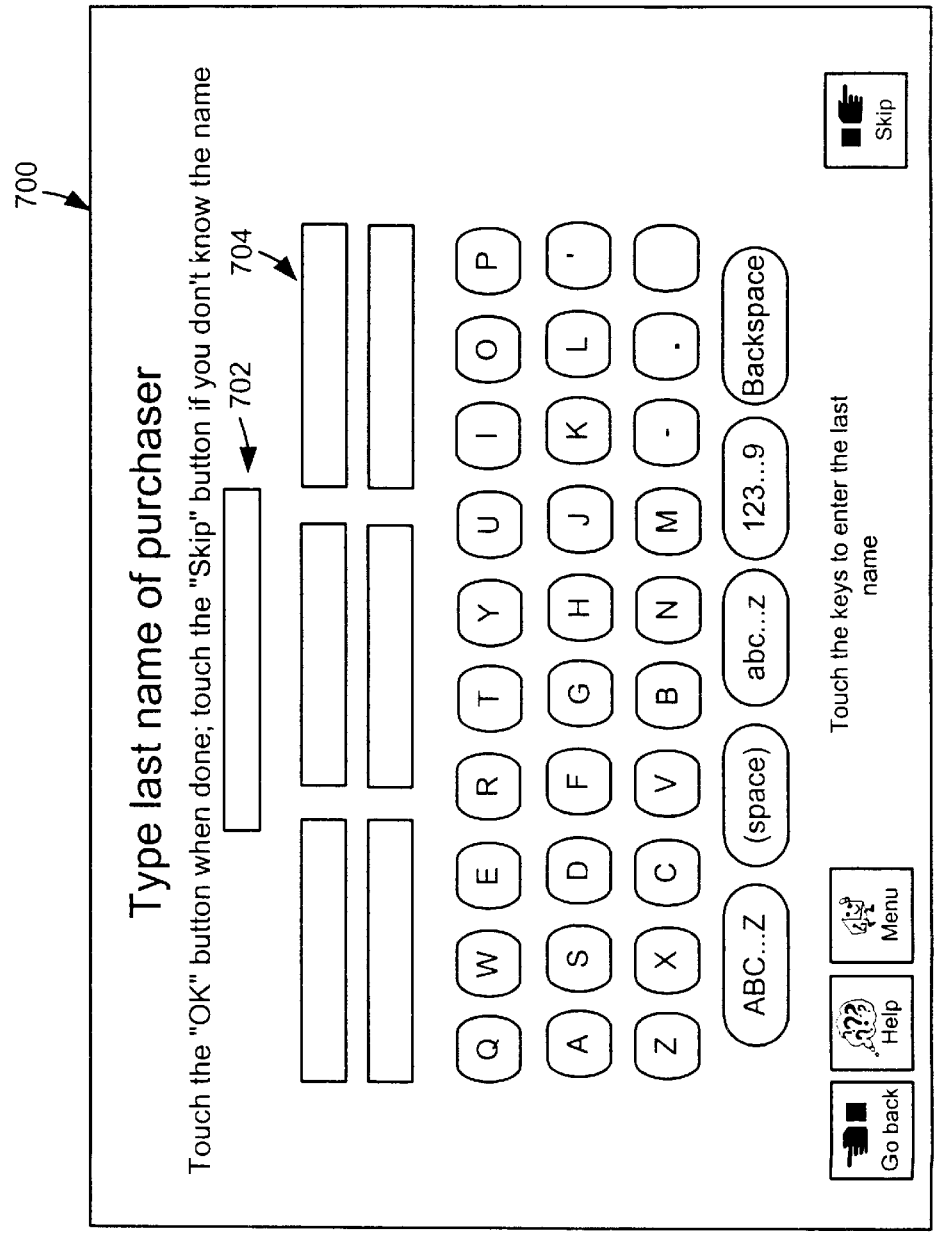

If the Skip button on the screen display 600 is touched, a screen display 700 as shown in FIG. 7 is presented to the customer on the touch screen monitor 208. The screen display 700 includes buttons replicating a QWERTY keyboard which allows the customer to touch in the customer's name. As the customer begins touching in the customer's name, the customer's name begins appearing in a region 702 of the screen display 700. As each letter of the customer's name enters the region 702, a selection of names starting with the letters appearing in the region 702 are retrieved from the name and address database of the in-store processor 112 and are displayed in a region 704. In the preferred embodiment, up to six such names may be displayed in the region 704, although any number of names may be displayed in this manner. As each additional letter is entered into the region 702, the selection of names which is offered the customer in the region 704 changes.

When one of the names appearing in the region 704 is the customer's name, the customer selects that name by touching the appropriate button in the region 704. Alternatively, the customer may fully enter the customer's name and then touch the OK button which appears in place of the Skip button as the customer begins entering the customer's name. When the customer touches the appropriate button or the OK button, the MPU kiosk 104 transmits the customer's name to the in-store processor 112 which searches the name and address database for the identity of the customer. If the customer is identified, the in-store processor 112 searches the HFM database for any transactions involving items which the customer has not yet picked up. If the customer chooses to use an alternative identification method, such as when the customer's name is not found in the name and address database of the in-store processor 112 and is, therefore, not displayed in the region 704, the customer touches the Skip button on the screen display 700.

Figure 8:
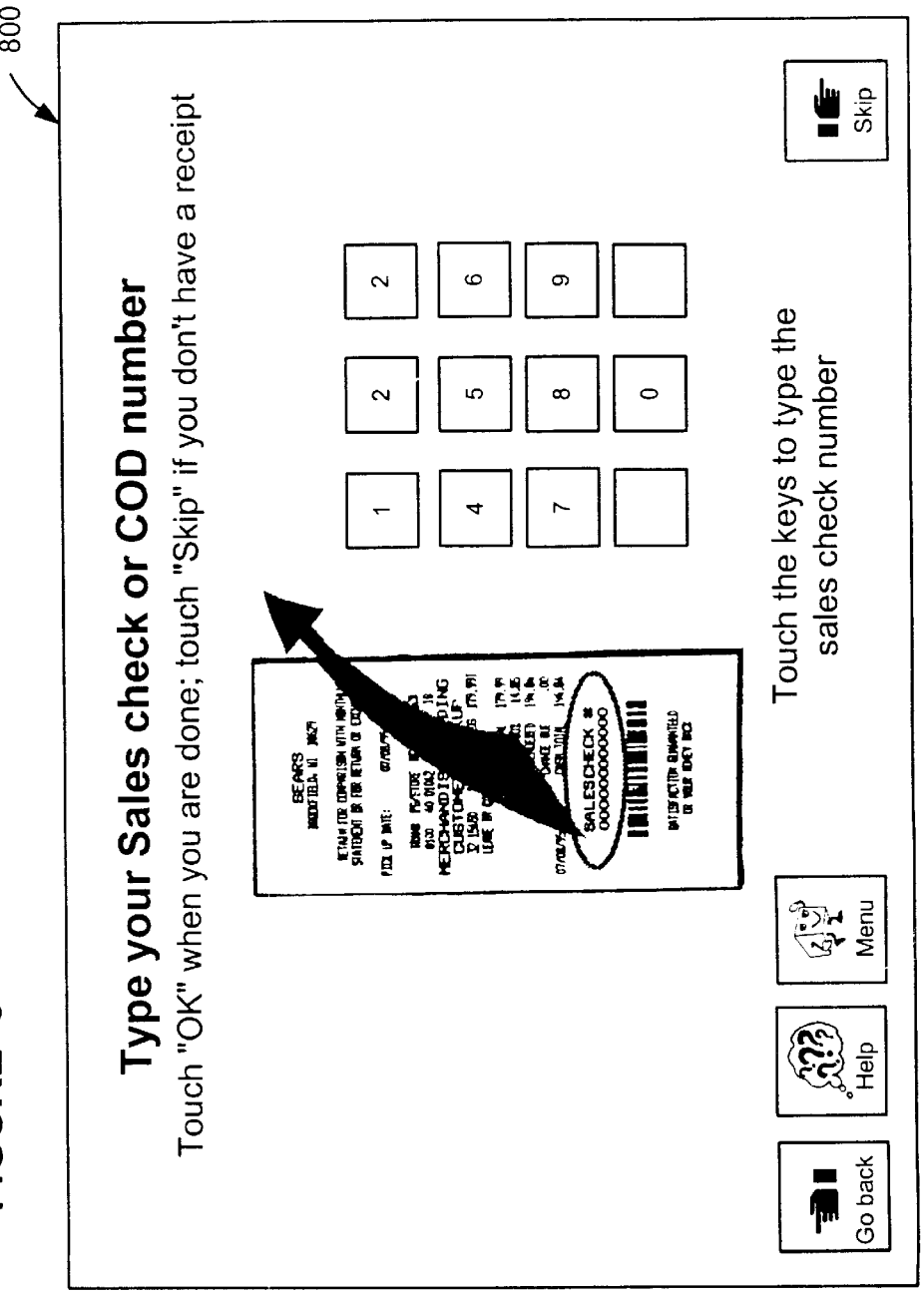

If the Skip button on the screen display 700 is touched, a screen display 800 as shown in FIG. 8 is presented to the customer on the touch screen monitor 208. The screen display 800 presents a number pad including buttons numbered between zero and nine. By touching the buttons on the screen display 800, the customer may enter the sales check number printed on the customer's sales check issued by a point-of-sale register. The screen display 800 also includes an example of a sales check and designates the area on the sales check where the sales check number may be found. As the sales check number is entered, an OK button appears beside the Skip button. When the customer fully enters the sales check number, the customer touches the OK button which causes the MPU kiosk 104 to transmit the sales check number to the in-store processor 112. The in-store processor searches the HFM database for any items which are covered by this sales check but which have not yet been picked up.

As discussed above, when the customer is identified by use of the screen display 500, the screen display 600, the screen display 700, or the screen display 800, the pertinent search criterium is transmitted by the MPU kiosk 104 over the communication channel 102 to the in-store processor 112 which searches the name and address database and/or HFM database for the transactions involving an item not yet picked up. These transactions are returned by the in-store processor 112 to the MPU kiosk 104 and are presented by the MPU kiosk 104 to the customer. However, if the in-store processor 112 cannot find a transaction based upon the search criterium provided to it by the customer through use of the screen displays 500–800, or if the customer skips all of the screen displays 500–800 by touching the Skip buttons described above, a screen display 900 is presented to the customer.

The screen display 900 is a three-way exit screen display which allows the customer (i) to try again by going back to the previous screen display (i.e., the screen display 800) by touching the Go back button, (ii) to request help from a sales associate by touching the Help button, or (iii) to quit (i.e., to return to the welcome screen) by touching the OK button. Thus, if the customer touches the Go back button on the screen display 900, the customer is returned to the screen display 800, and from there the customer may go back to the screen displays 500–700 in reverse order by touching corresponding Go back buttons. On the other hand, touching the OK button returns the customer to the welcome screen display so that the MPU kiosk 104 may be used by another customer.

Figure 10:
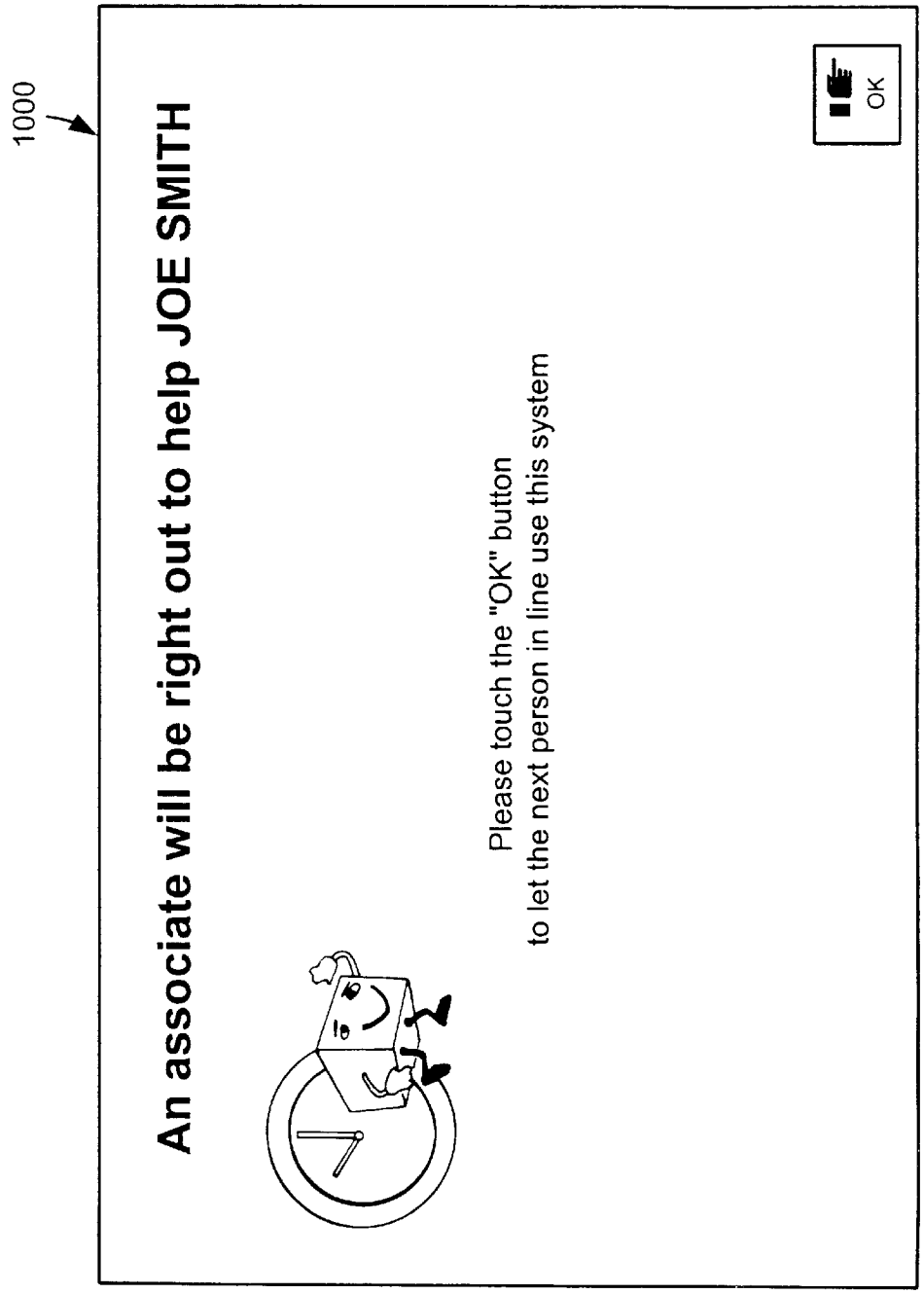

If the customer selects the Help button on the screen display 900, a message is transmitted by the MPU kiosk 104 over the communication channel 102 in order to summon an MPU associate, and the customer is presented with a screen display 1000 as shown in FIG. 10. This screen display 1000 informs the customer that an associate is being notified in order to help the customer, and requests the customer to touch the OK button. Touching the OK button on the screen display 1000 returns the customer to the welcome screen display so that another customer may use the MPU kiosk 1041.

Figure 11:
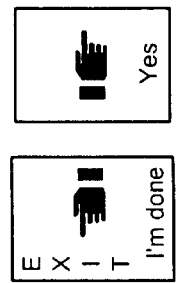

If at any time the customer does not touch one of the screen displays, other than the welcome screen display, within a predetermined amount of time, a screen display 1100 shown in FIG. 11 is presented on the touch screen monitor 208. The screen display 1100 allows the customer to indicate whether the customer needs more time by touching the Yes button or whether the customer wishes to exit by touching the I'm done button. Touching the I'm done button returns the customer to the welcome screen display. If the customer touches neither of these two buttons within a predetermined amount of time, the item pick up system 100 automatically returns the MPU kiosk 104 to the welcome screen display.

Figure 12:
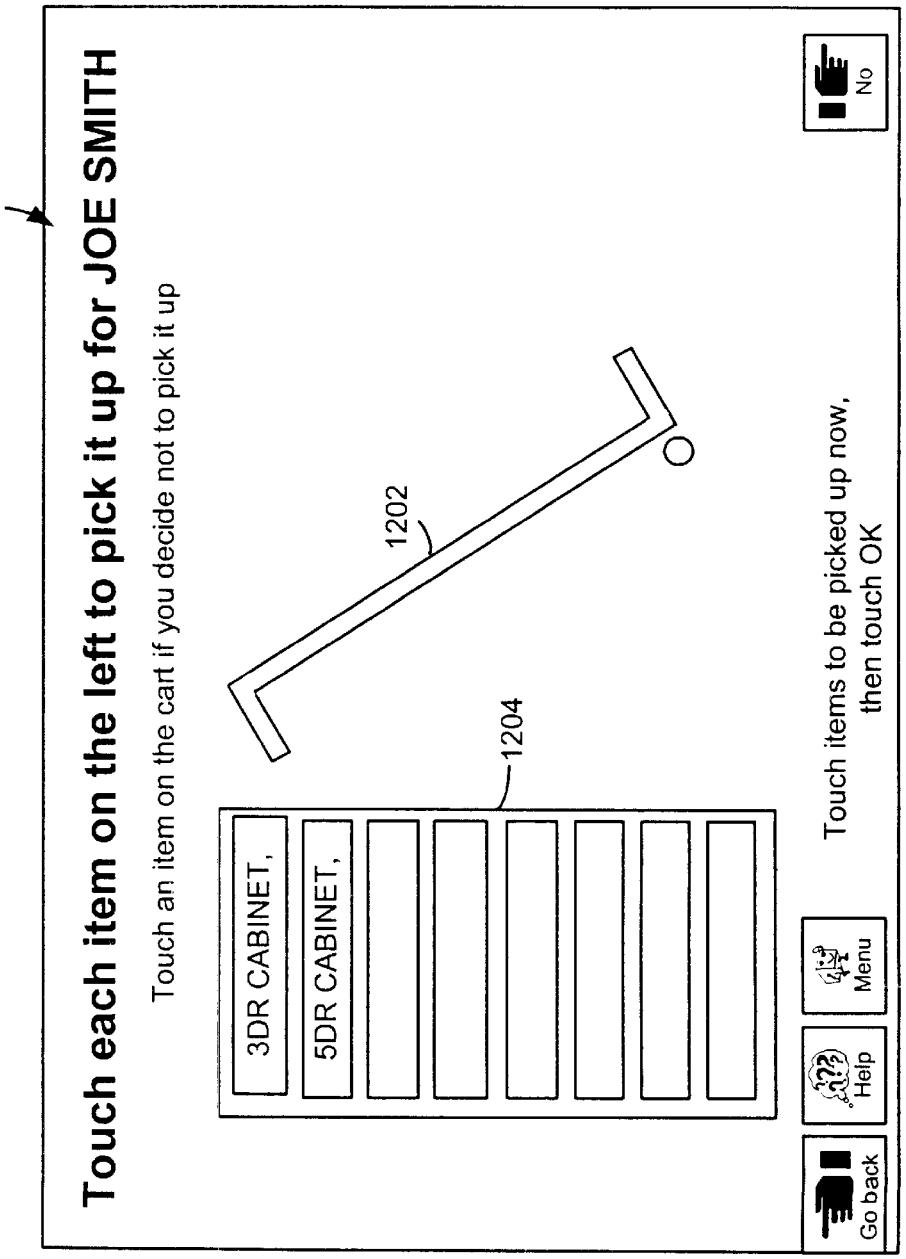
Figure 14:
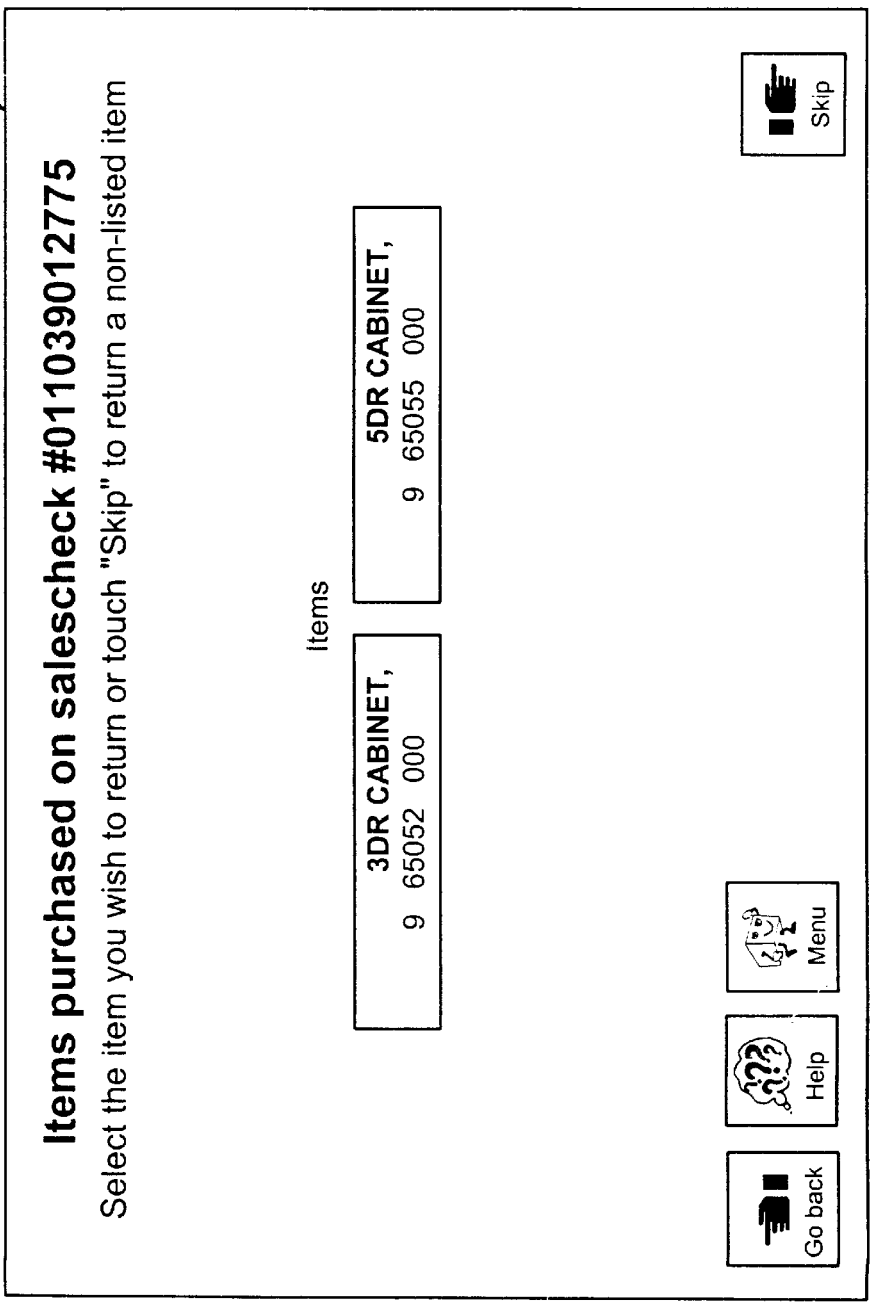
Figure 15:
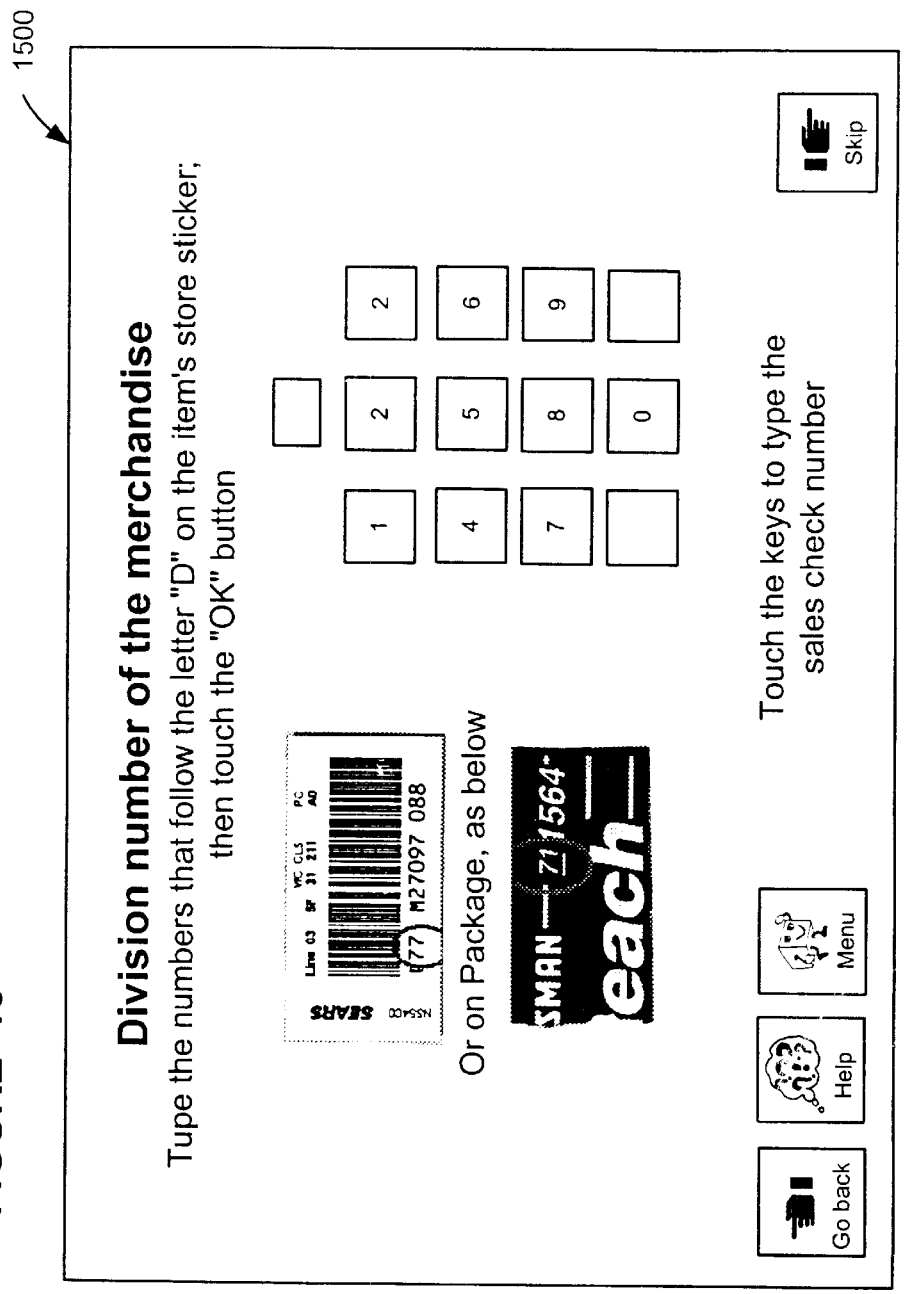
Figure 16:
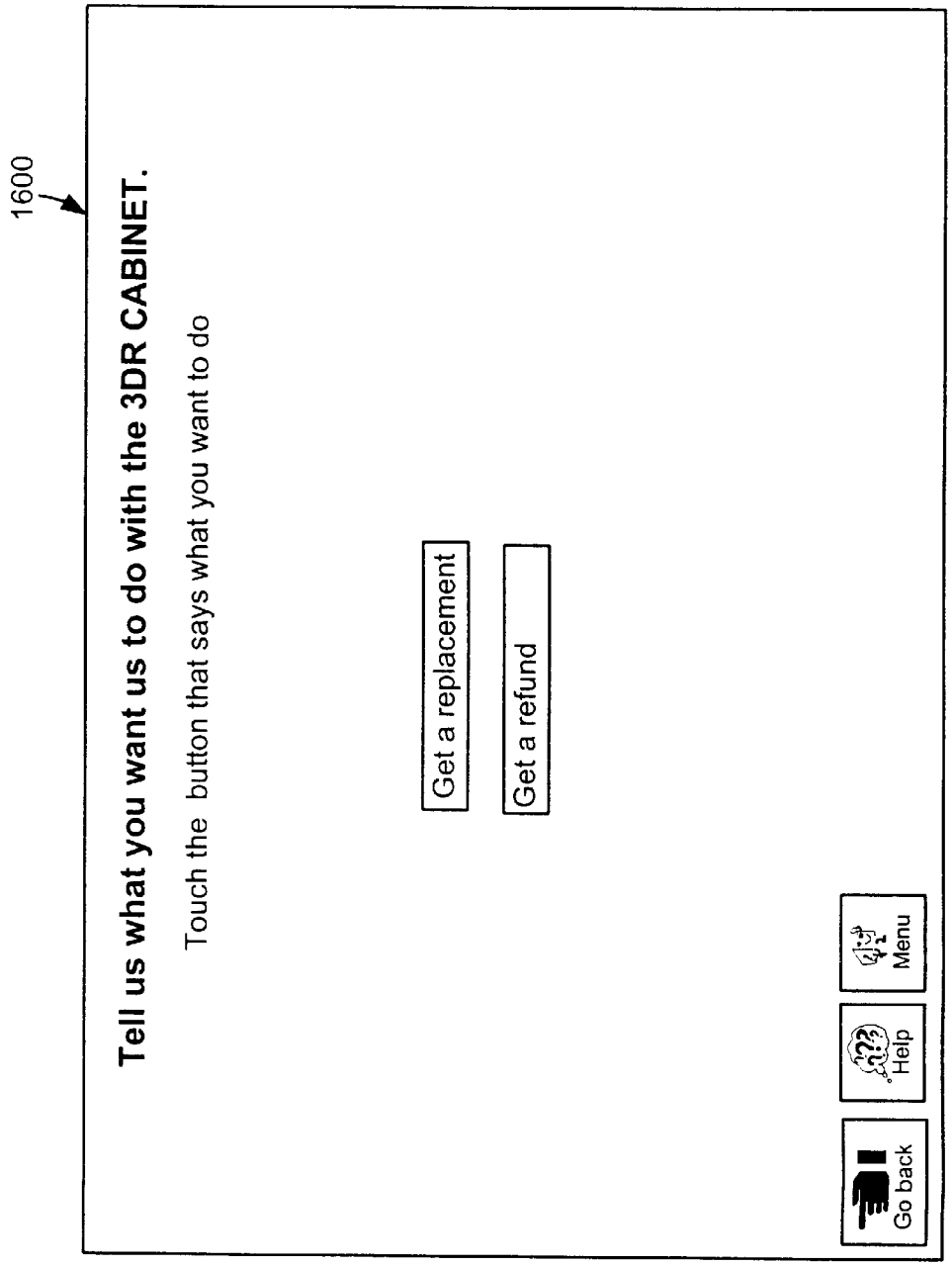

When a customer's transaction is found in the HFM database of the in-store processor 112 by use of one of the search methods represented by the screen displays 500–800, the customer is presented with a screen display 1200 as shown in FIG. 12. The screen display 1200 displays items (i) which have not yet been picked up and which are covered by the sales check identified through the use of the screen display 500 or the screen display 800 or (ii) which have not yet been picked up and which pertain to any transaction involving the customer identified through the use of the screen display 600 or the screen display 700. In an example illustrated by the screen display 1200, the customer has purchased, but has not yet picked up, a three-drawer cabinet and a five-drawer cabinet.

The screen display 1200 also includes a hand truck icon 1202 and a shelf icon 1204. If there is only one item for the customer to pick up, that item appears as an icon on the hand truck icon 1202 instead of on the shelf icon 1204. However, because more than one item have not yet been picked up by the customer in this example, these items are displayed as icons on the shelf icon 1204. The customer may select, for pick up, one or more of the items displayed on the shelf icon 1204 by touching the button identifying the chosen item. When this button is touched, the item represented by that button moves to the hand truck icon 1202. As the next item is selected, that item also moves to the hand truck icon 1202, and so on. When an item is on the hand truck icon 1202, an OK button appears next to the No button of the screen display 1200. An item on the hand truck icon 1202 can be deselected by touching the icon representing that item as it appears on the hand truck icon 1202. Touching this icon moves the item to the shelf icon 1204. Touching the Go back button returns the customer to the screen display 800 to search for another transaction.

Touching the OK button completes the selection process and causes the MPU kiosk 104 to transmit a message over the communication channel 102 to the work station 108. The work station 108 controls the customer display 110 so that the customer's name is added to the Waiting section of the customer display 110. Additionally, the MPU kiosk 104 sends a message to the in-store processor 112 directing the in-store processor 112 to notify the MPU associate over the communication channel 102. The display of the portable display device displays, for example, the bar coded sales check number for the transaction involved in the pick up, the customer's name, the item to be picked up, the current location of the item (such as in a staging area near the merchandise pick up area for an item picked up on the original day of sale, or such as in a bin in a holding area for an item to be picked up on a day other than the original date of sale), and where the item is to be delivered (such as a customer waiting area, or the customer's car). If a printer is used as the notification device instead of the portable display device, or a pager, the printer prints the same information. Alternatively, when the work station 108 receives the message transmitted over the communication channel 102 by the MPU kiosk 104, the work station may itself notify the MPU associate the information described above.

If the No button on the screen display 1200 is touched, an Out of Stock screen display (not shown) is presented to the customer informing the customer that the items to be picked up are currently out of stock, and the customer is then presented with a three way exit screen display similar to the screen display 900. On the other hand, if the item to be picked up simply cannot be found in the database, this three way exit screen display is presented directly to the customer.

Also, when the OK button on the screen display 1200 is touched, a screen display 1300 is presented to the customer. The screen display 1300 is a thank you screen display which thanks the customer for using the item pick up system 100, which requests the customer to wait while the selected item is being retrieved by an MPU associate, which indicates the items being retrieved for the customer, which informs the customer that the customer's items will be brought out from the stock room, and which directs the customer to watch the customer display 110. When the customer touches an OK button of the screen display 1300, the MPU kiosk 104 returns to the welcome screen.

The MPU associate retrieves the item to be delivered to the customer from the stock room. The MPU associate enters the customer identification and item to be delivered to the customer in the work station 108 (or the portable display device) which causes the work station 108 (or the portable display device) to transmit a message to the customer display 110 so that the customer display may be updated by moving the customer's name from the Waiting section to the Now-Serving section of the customer display 110. For example, the customer display 110 displays in its Waiting section the names of the customers who have used the MPU kiosk 104 and are waiting for an MPU associate to find and bring the item to be picked up by the waiting customers. When the MPU associate enters in the work station 108 (or the portable display device) the customer identification and item to be delivered to the customer, the customer's name is moved to the Now-Serving section of the customer display 110 indicating that the item to be picked up by the customer has been found and is being brought to the merchandise pick up area. The MPU associate then delivers the item to the customer.

At the time that the MPU associate enters the customer identification and item to be delivered to the customer in the work station 108, the work station 108 also transmits a message to the in-store processor 112 so that the HFM database of the in-store processor 112 may be updated. For example, the in-store processor 112 updates the HFM database to indicate that the item has been picked up by the customer.

If the customer selects the Merchandise Return button on the screen display 300, the customer is required to enter a customer identification through the use of any one of the screen displays 500–800. When the customer is identified by use of the screen displays 500–800, the pertinent search criterium is transmitted by the MPU kiosk 104 over the communication channel 102 to the in-store processor 112 which searches the database for each item (i) which has been picked up and which is covered by the sales check identified through the use of the screen display 500 or the screen display 800 or (ii) which has been picked up within a past predetermined amount of time and which pertains to any transaction involving the customer identified through the use of the screen display 600 or the screen display 700.

Upon completion of the search, the in-store processor 112 transmits a message over the communication channel 102 to the MPU kiosk 104 identifying the items found by the search. These items are presented by the MPU kiosk 104 to the customer in the form of a screen display 1400. The screen display 1400 also displays the sales check number of the sales check if the sales check is identified through the use of the screen display 500 or the screen display 800. In an example illustrated by the screen display 1400, the items are a three-drawer cabinet and a five-drawer cabinet. The customer may select one of the displayed items, which were identified based upon the search criteria supplied by the customer, through use of one of the screen displays 500–800 by touching the pertinent button.

If the customer wishes to return an item which is not displayed, the customer may touch the Skip button. If the customer touches the Skip button on the screen display 1400, or if no items appear on the screen display 1400 because no items were found as a result of the search, a QWERTY screen display similar to the screen display 700 is presented to the customer. However, this QWERTY screen display requests the customer to identify the product to be returned by touching the buttons of a QWERTY display. As these buttons are touched, the corresponding letters are inserted into a region similar to the region 702. This region has a button on each of two of its sides. These buttons allow the customer to erase the last entered letter or erase all of the entered letters. This QWERTY screen display also has an OK button by which the customer may indicate when the full name of the item to be returned has been entered. The customer may skip this screen display by touching the Skip button.

When this OK button is touched, or if this QWERTY screen display is skipped, a screen display 1500 is presented to the customer. The screen display 1500 directs the customer to enter the division number of the item to be returned. This division number identifies the area of the sales floor of the retail sales establishment which normally stocks the item to be returned. To assist the customer in locating the division number on the label or price tag which was on the item at the time of purchase, the screen display 1500 includes a sample label or price tag and indicates the area on the label or price tag where the division number can be found. The screen display 1500 also presents to the customer a portion of a package and indicates where on the package the division number may be found. The customer may enter the division number using numbered buttons. The screen display 1500 directs the customer to touch the Skip button if the customer cannot locate the division number. The customer may skip the screen display 1500 by touching the Skip button which causes an UPC screen display to be presented to the customer.

This UPC screen display is similar to the screen display 1500 and requests the customer to enter the item's UPC (uniform price code) by touching appropriately numbered buttons. To assist the customer in locating the UPC on the label or price tag which was on the item at the time of purchase, this UPC screen display includes a sample label or price tag and indicates the area on the label or price tag where the UPC can be found. The customer may skip this screen display by touching a Skip button.

On the other hand, an OK button appears on the screen display 1500 after the customer begins entering a division number. The screen display 1500 requests the customer to touch the OK button when the customer finishes entering the division number of the item to be returned. If the OK button on the screen display 1500 is touched, a stock number screen display similar to the screen display 1500 is presented to the customer. This stock number screen display directs the customer to enter the stock number of the item to be returned, and advises the customer by suitable icons where the customer might find the stock number either on a label or price tag which is attached to the item at the time of its purchase or on a package of the item. To assist the customer in locating the stock number on the label or price tag which was on the item at the time of purchase, this stock number screen display includes a sample label or price tag, and indicates the area on the label or price tag or on the package where the stock number can be found. The customer may skip this screen display by touching a Skip button.

Upon complete entry of the stock number, the customer touches an OK button. If this OK button is touched, or if the stock number screen display is skipped, an SKU screen display similar to the screen display 1500 is presented to the customer. This SKU screen display requests the customer to enter a stock keeping unit (SKU) which is typically on an item's label or price tag that is attached to the item. To assist the customer in locating the stock keeping unit on the label or price tag which was on the item at the time of purchase, this screen display includes a sample label or price tag, and indicates the area on the label or price tag where the stock keeping unit can be found. The customer may skip this screen display by touching a Skip button.

Upon complete entry of the stock keeping unit, the customers touches an OK button. If this OK button is touched or if the SKU screen display is skipped, or if the UPC screen display is skipped, or if the UPC is completely entered on the UPC screen display and the OK button thereon is touched, or if the customer selects an item displayed on the screen display 1400, the screen display 1600 is presented to the customer.

The screen display 1600 requests the customer to indicate whether the customer wishes to obtain a replacement (i.e., an exchange) or a refund for the returned item. Upon selecting a button on the screen display 1600, the customer is presented with a more returns screen display (not shown) requesting the customer to indicate, by touching a Yes button or a No button, whether there are other items to be returned. When the Yes button is touched, the customer is presented with the appropriate screen displays described above which are used to find the other items in the HFM database of the in-store processor 112. When the No button is touched, a message is transmitted over the communication channel 102. This message causes the MPU associate to be notified by the paging system 116 and/or causes the work station 108 to display or print a suitable notice to the MPU associate. Also, either the portable display device or the work station 108 prints a tag which has first and second sections. The first section is used to tag and identify the item being returned. The second section of the tag is given to the customer to confirm that an item has been returned and to indicate the disposition of the returned item. The second section of this tag is taken by the customer to a point-of-sale register $106_1$–$106_n$, where a refund will be processed. If the customer had received an exchanged item instead of a refund, the customer may retain the second portion as a receipt, which can be used as a record of the exchange transaction.

In the case where the items to be returned are selected from the screen display 1400, this message contains sufficient information to allow the tag to be printed. In the case where the items to be returned are described by use of the QWERTY screen display, the screen display 1500, the UPC screen display, the stock number screen display, and/or the SKU screen display described above, this message is a default message containing only the information provided by the customer. In this case, a tag is printed with only the information provided by the customer. After this tag is printed, therefore, the MPU associate must then manually enter on the tag any additional required information not provided by customer and/or correct any the information which was entered incorrectly by the customer. The tag is then applied.

Also, when the No button on the more returns screen display is touched, the customer is presented with a return thank you screen display (not shown) similar to the screen display 1300. This return thank you screen display requests the customer to wait until an MPU associate comes out to pick up the returned item, informs the customer that the MPU associate will bring out the new item if the customer had requested an exchange, informs the customer that the customer will be issued a receipt for any items that are returned, and directs the customer to take the receipt to the sales floor for a price refund. This return thank you screen display has an OK button which, when touched by the customer, returns the MPU kiosk 104 to the welcome screen display.

Figure 17:
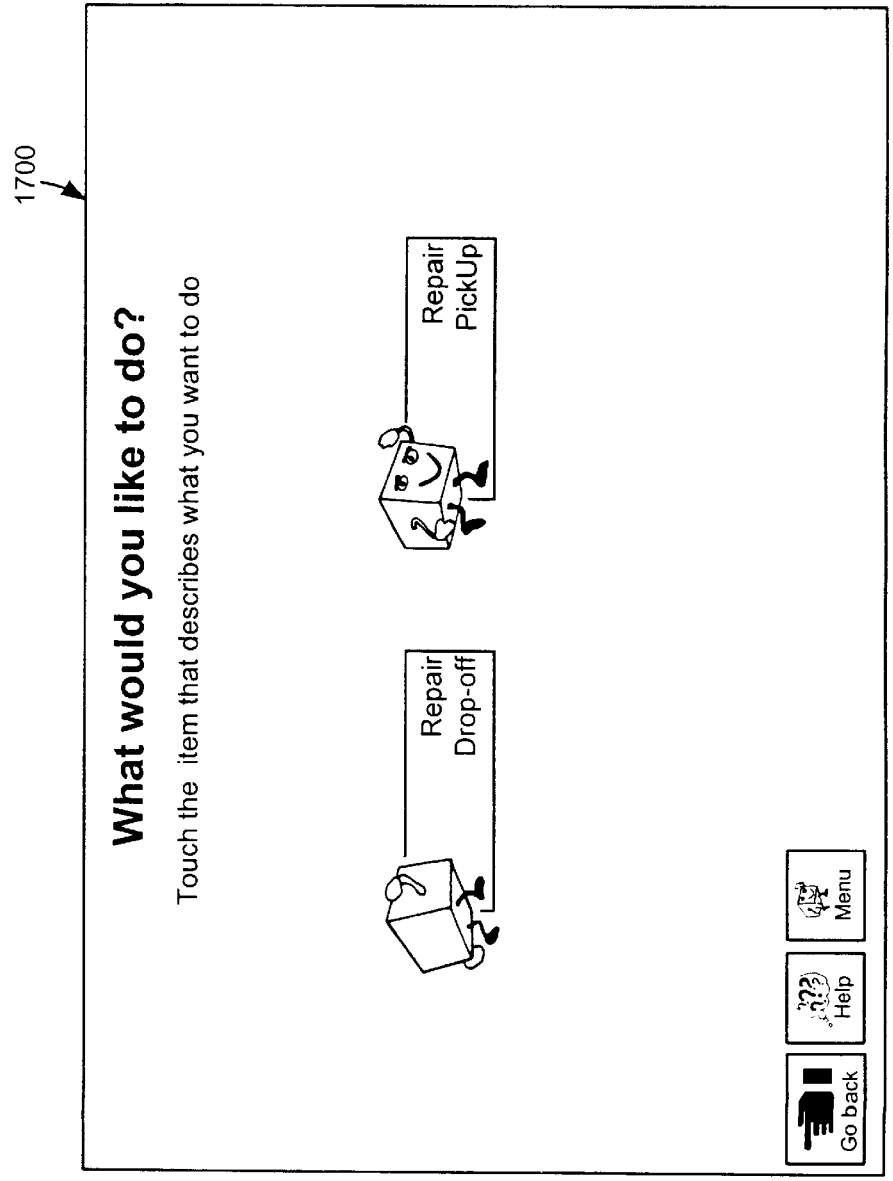

When the customer touches the Repair & Service button on the screen display 300, the customer is presented with a screen display 1700 as shown in FIG. 17. The screen display 1700 requests the customer to indicate, by touching an appropriate button, whether an item is being dropped off for repair or servicing, or whether an item is being picked up following repair or servicing.

Figure 18:
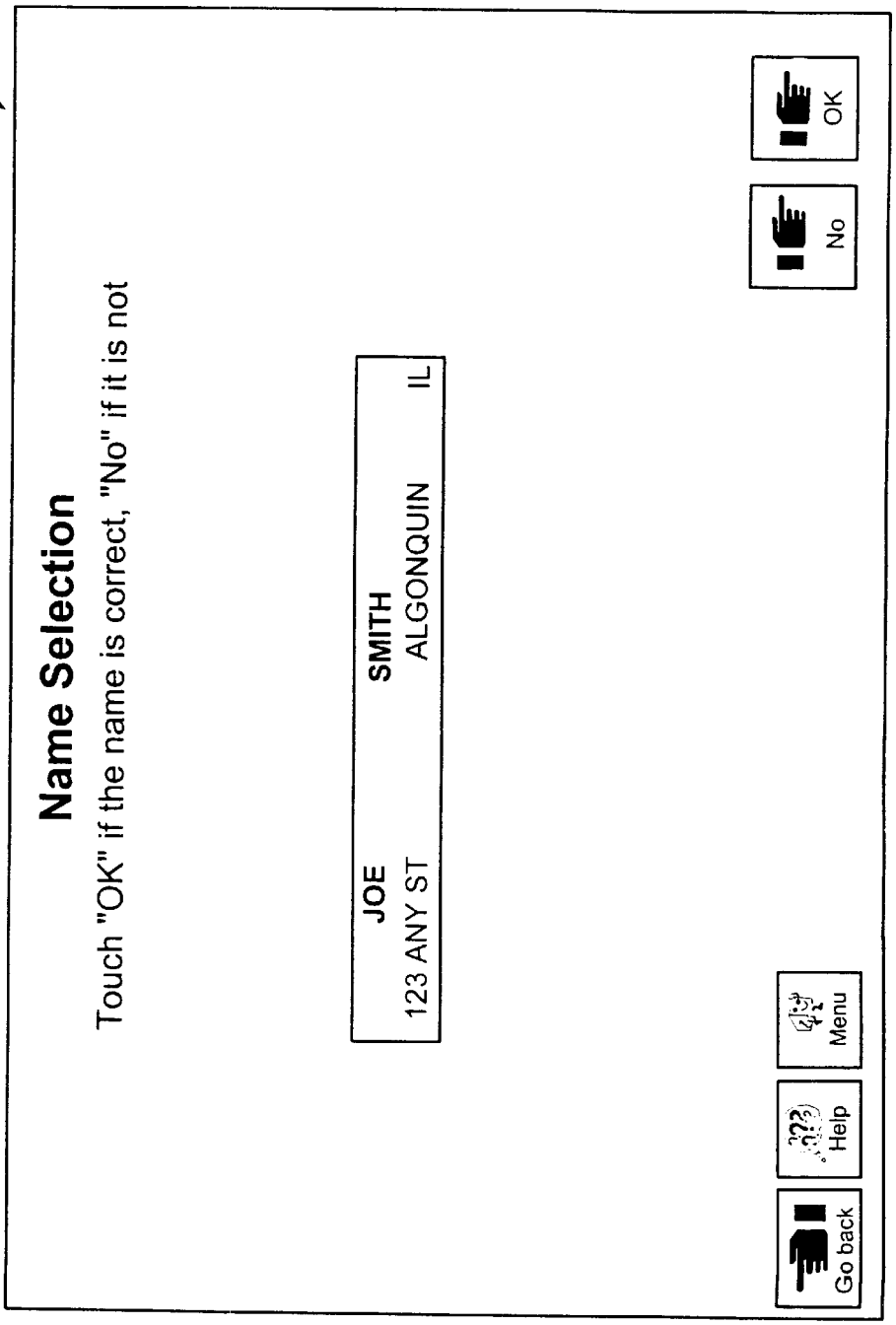

After the customer touches either one of the buttons on the screen display 1700, the customer is requested to identify himself or herself by use of one of the screen displays 500–800. When the customer has been identified, the customer is presented with a screen display 1800 as shown in FIG. 18. The screen display 1800 requests the customer to indicate whether or not the customer's identification on the screen display 1800 is correct. If it is correct, the customer touches the OK button, and if it is not correct, the customer touches the No button allowing the customer to enter the correct information.

Figure 19:
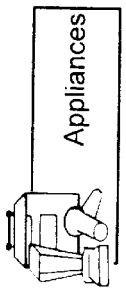

If an item is to be repaired, it may be sent to one of several repair facilities depending on the item. The particular repair facility must be identified. Accordingly, when the customer's identity is verified, and if the customer had touched the Repair Drop-Off button on the screen display 1700, the customer is presented with a screen display 1900 as shown in FIG. 19. The screen display 1900 requests the customer to generally describe the item, and presents to the customer several general choices in the form of buttons for this purpose.

Figure 20:

After the customer indicates one of the general categories on the screen display 1900, or touches the Skip button, a screen display 2000 as shown in FIG. 20 is presented to the customer. The screen display 2000 includes buttons of a QWERTY keyboard allowing the customer to describe the item by touching the appropriately lettered buttons on the screen display 2000. As each button on the QWERTY keyboard is touched, a corresponding letter is entered into a region 2002, and the MPU kiosk 104 sends a message to the in-store processor 112 to retrieve from the database of the in-store processor 112 a sample of pre-loaded products described by the letters thus far entered into the region 2002. These samples are presented to the customer in a region 2004. The customer may select one of the products displayed in the region 2004 by touching the corresponding button. Alternatively, the customer may fully enter the description of the item by use of the QWERTY keyboard buttons. The customer touches the OK button when all letters have been entered.

Following the description of the item by the use of the screen display 2000, the customer is presented with a manufacturer screen display which is similar to the screen display 2000 but in which the customer is requested to enter the name of the manufacturer of the item. The manufacturer screen display, like the screen displays before, can be skipped if the customer, for example, does not know the name of the manufacturer.

If the customer either skips this manufacturer screen display or enters the name of the manufacturer and presses a corresponding OK button, a model number screen display similar to the screen display 2000 is presented to the customer. The customer is requested to enter the model number of the item in the model screen display. If the customer elects to skip this model number screen display or enters the model number and touches a corresponding OK button on the model number screen display, a serial number screen display, similar to the screen display 2000 but without the region 2004, and with number keys instead of letter keys, is presented to the customer. The serial number screen display requests the customer to enter the serial number of the item.

If the customer cannot describe the product and does not enter the manufacturer, model number, and serial number, or if the customer can describe the product but does not enter the manufacturer, model number, and serial number, it is assumed that the repair will be done locally. Payment for local repairs is made when the repair is picked up, as described below. However, if the MPU associate, who will retrieve the item to be repaired from the customer at the end of the repair drop-off transaction, determines that repair at a remote facility is required, prepayment may be required, as described below.

If the customer skips the serial number screen display (for example, because the customer does not know the serial number), or when the customer enters the serial number and touches a corresponding OK button, the customer is presented with a screen display 2100 shown in FIG. 21. The screen display 2100 presents to the customer a list of probable problems tailored to the item identified by the screen displays 2000 et seq. described above. The customer is requested to indicate the reason for the repair in the screen display 2100. As long as the customer does not select one of the reasons presented by the screen display 2100 by touching a Yes box, the screen display 2100 includes a Skip button which allows the customer to skip to the next screen display. Once the customer chooses one of the Yes boxes in the screen display 2100, the Skip button disappears and an OK button appears allowing the customer to confirm the selected reason for repair or servicing. After the customer touches the OK button on the screen display 2100, or if the customer selects the Skip button on the screen display 2100, a QWERTY screen display (not shown) is presented to the customer which allows the customer to specify another reason for the repair or servicing.

Figure 22:
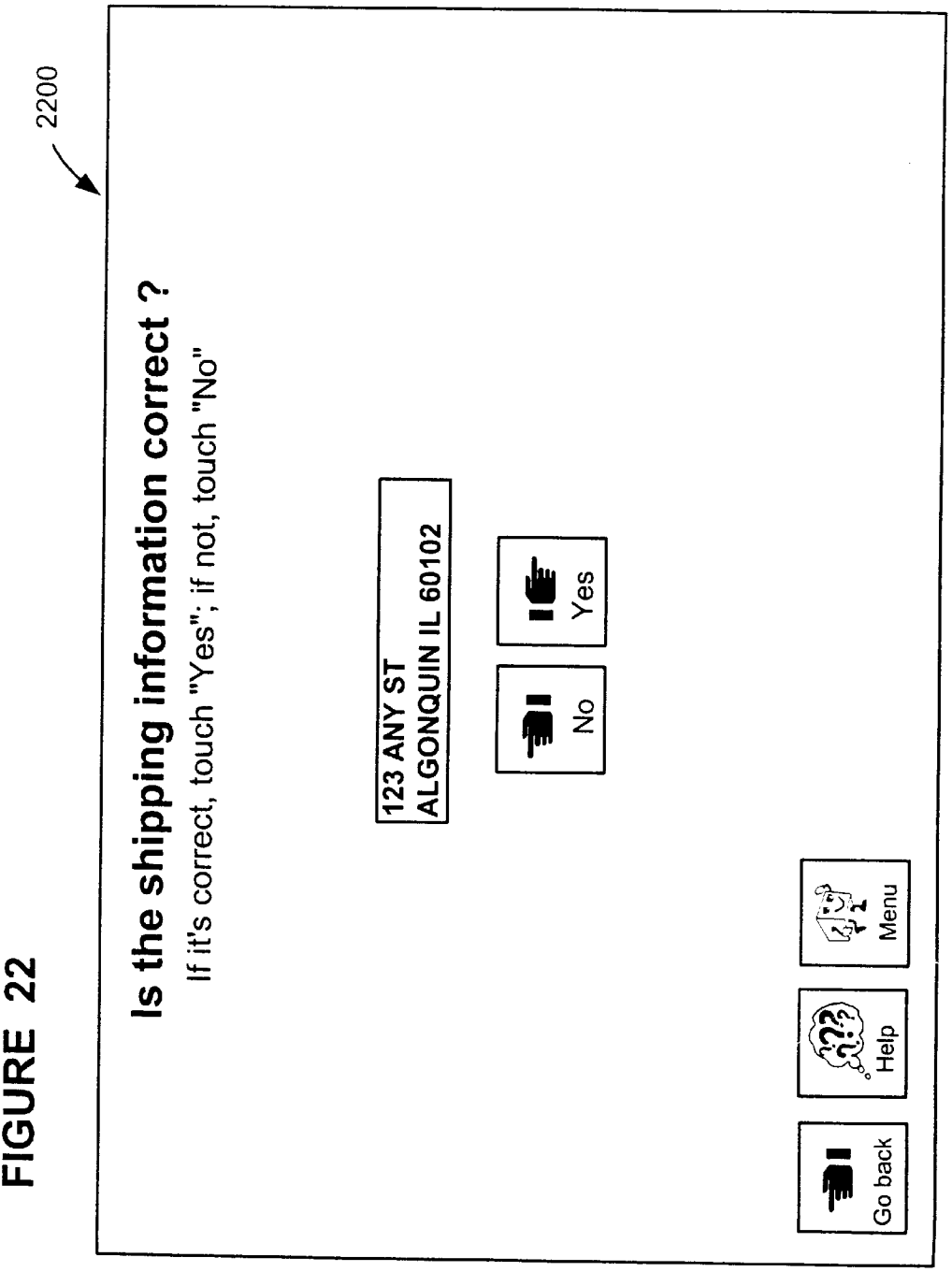

After the customer chooses one or more of the Yes boxes in the screen display 2100 and touches the OK button, and/or after the customer specifies another reason for the repair using the QWERTY-type screen display which appears after the screen display 2100, a screen display 2200 as shown in FIG. 22 is presented to the customer. The screen display 2200 displays the customer's address. If the customer's address is incorrect, the customer touches the No button and screen displays (not shown) appear which allow entry of the correct information. If the Yes button is touched, an MPU associate message (as described below) is transmitted over the communication channel 102. The screen display 2200 is presented to the customer only in the case where repair is to be done at a remote facility. Thus, if repair is to be done locally, the screen display 2200 is not presented to the customer.

An item which cannot be repaired locally must be sent to a remote repair facility. Following repair, such an item is typically sent directly to the customer's residence. Therefore, the item which is to repaired at a remote repair facility will be sent to the verified address presented by the screen display 2200. Also, any repair charge must be prepaid. As a result, if repairs to an item are to be made at a remote repair facility, and if the customer touches the Yes button on the screen display 2200, a cash or credit screen display is presented to the customer which allows the customer to pay for the repair of the item by either cash or credit. The cash or credit screen display also presents to the customer the amount of the repair.

If the customer selects cash as the payment option, a series of screen displays (not shown) instruct the customer on how to make a cash payment (including inserting the cash amount covering the repair charge into the cash receptor 204 of the MPU kiosk 104). Following payment, the MPU associate message is transmitted over the communication channel 102.

Figure 23:
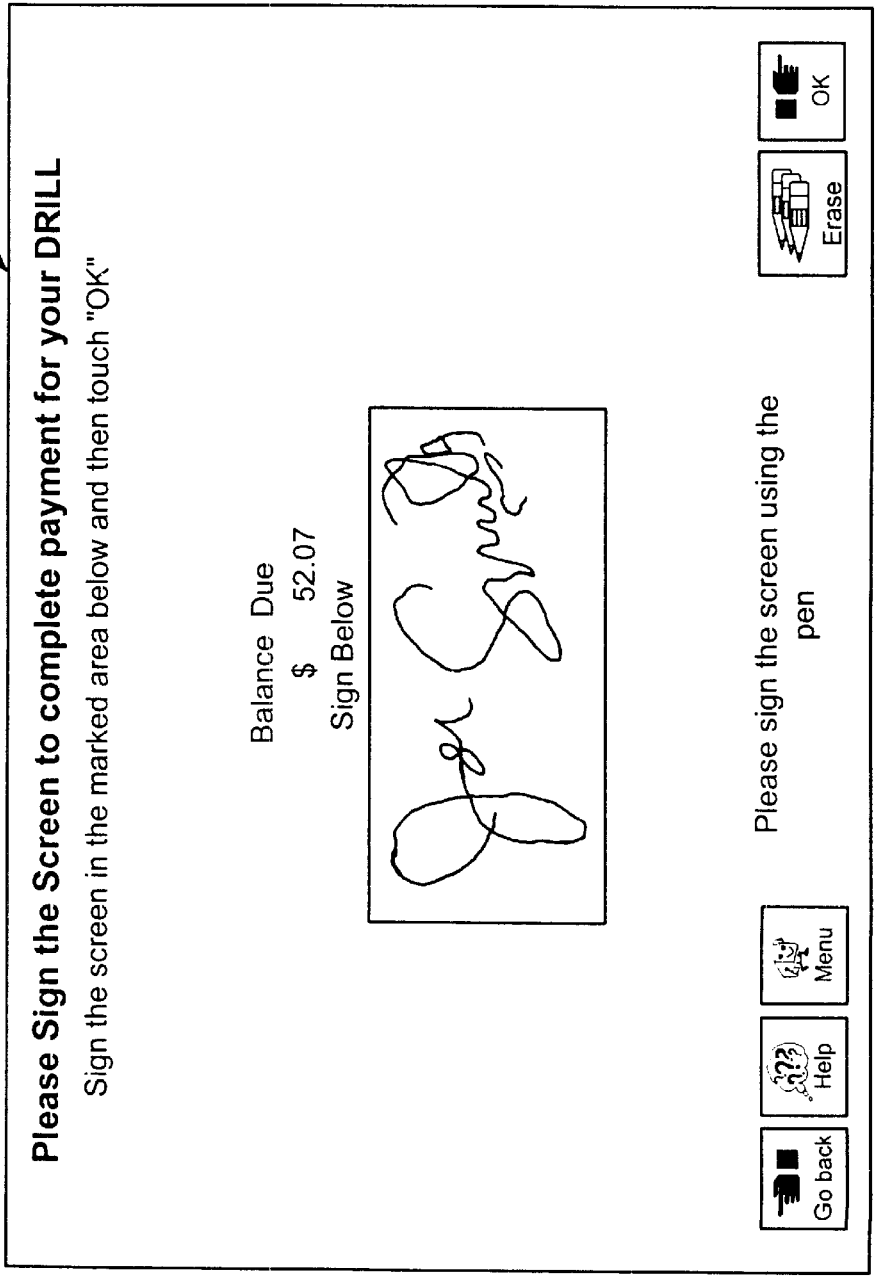

If the customer selects credit as the payment option, the customer is presented with a credit card screen display (not shown) which instructs the customer to insert and remove the customer's credit card from the magnetic stripe reader 202. This credit card screen display also shows the customer the proper orientation of the credit card for insertion into the magnetic stripe reader 202. After the credit card is removed from the magnetic stripe reader 202, the customer is presented with a screen display 2300 as shown in FIG. 23. The screen display 2300 requests the customer to sign the customer's name in the indicated box by use of the stylus 206. After completing the signature, the customer is requested to touch the OK button. Upon the customer touching the OK button on the screen display 2300, the MPU associate message is transmitted over the communication channel 102.

If the repair charge cannot be processed to the customer's charge account, or if the customer refuses to pay any required repair charge (such as by not entering payment information within a predetermined amount of time or skipping the payment screen displays), a three-way exit screen display is presented to the customer. This three-way exit screen display (not shown) allows the customer (i) to go back to any previous screen display and enter correct information, (ii) to request help from an MPU associate, who will then attempt to assist the customer, or (iii) to end the transaction by touching an OK button. The payment requirement may only be overridden by intervention of a management or other authorized associate who may handle the transaction manually on a cash register.

An item which is to be repaired locally is typically picked up by the customer following repair. Because the customer will pick up the item following repair, there is no need to require that the repair charge be prepaid. Usually, this item is repaired on a time and materials basis, or the repair is covered under warranties or a service contract. As a result, if repairs to an item are to be made locally, and if the repaired item has been identified (e.g., by use of the screen displays 1900 and 2000), a screen display 2400 as shown in FIG. 24 is presented to the customer. By use of the screen display 2400, the customer can indicate whether the repair is covered under warranty, whether a service contract applies to the item to be repaired, or whether there is no warranty. If there is no warranty or service contract, the customer pays for the repair on a time and materials basis at the time that the customer picks up the repaired item. The repaired items are repaired locally and are returned to the local retail sales establishment after repair for pick up by the customer.

Figure 25:

If the customer chooses the Warranty button or the Service Contract button on the screen display 2400, a screen display 2500 as shown in FIG. 25 is presented to the customer. The screen display 2500 requests the customer to enter the year in which the item was purchased. This information will be used by the service center to verify any warranty or service contract coverage.

Following entry of the year in the screen display 2500, a month screen display (not shown) is presented to the customer. The month screen display requests the customer to select the month in which the item was purchased and to verify the selected month by touching an OK button. Touching this OK button also causes the MPU associate message to be transmitted over the communication channel 102.

When the customer touches the OK button on the month screen display, or after the customer completes payment for items repaired remotely after the customer touches the Yes button on the screen display 2200, the printer in the cabinet 212 is caused to print a payment receipt if payment was required, and the MPU associate message is transmitted over the communication channel 102. This payment receipt is issued to the customer through the printer slot 210. This message causes the MPU associate to be notified by the paging system 116 and/or causes the work station 108 to display a suitable notice to the MPU associate. Also, the work station 110 is caused to print a two-part repair tag. Moreover, a repair drop-off thank you screen is presented to the customer.

The repair drop-off thank you screen display is similar to the thank you screen displays described above. This repair drop-off thank you screen display requests the customer to wait while an MPU associate is notified to pick up the item to be repaired. The repair drop-off thank you screen display also directs the customer to take the payment receipt, if any, from the printer slot 210.

The first part of the two-part repair tag is given by the MPU associate to the customer as a claim check for the items to be repaired, and the second part is attached to the items to be repaired.

Touching the OK button on the repair drop-off thank you screen display returns the MPU kiosk 104 to the welcome screen display.

If a repaired item is to be picked up by the customer as indicated by the customer when the customer touches the Repair Pick Up button- on the screen display 1700, the customer is presented with screen displays requesting the customer to enter the customer's identification. If any repaired item is to be picked up by the customer, there is a record of such an item in the in-store processor 112. Accordingly, after the customer indicates that the customer wishes to pick up the repaired item and enters the customer's identification, the customer is presented with a screen display 2600 as shown in FIG. 26. This screen display 2600 indicates to the customer the item which has been repaired and requests the customer to indicate whether the customer wishes to pick up this item.

If the customer indicates that the customer wishes to pick up the item and if payment for the repair is required, the payment screen displays described above are presented to the customer. When the customer completes the payment screens after selecting one or more items form the screen display 2600, or after selecting one or more items from the screen display 2600 when the repair is covered by a warranty or a service contract, a message is transmitted over the, communication channel 102. This message causes the MPU associate to be notified by the paging system 116 and/or causes the work station 108 to display a suitable notice to the MPU associate. This message, therefore, indicates the item to be picked up, identifies the transaction as a repair pick up,land identifies the customer. The MPU associate is thereby directed to deliver the repaired item to the customer.

Also, a repair pick-up thank you screen display appears allowing the customer to exit the system by touching an OK button.

If it is the policy of the retail sales establishment to always require a repair charge to be prepaid, the cash or credit screen display is always presented to the customer at the time of repair drop off.

If the customer touches the Loaners button on the screen display 300, the customer is presented with a screen display 2700 as shown in FIG. 27. Loaner transactions, for example, may originate on the sales floor at one of the point-of-sale registers 106₁–106ₙ. A sales associate at a point-of-sale terminal is typically in the best position to know which item is available for loan and to qualify the customer's need for a loaner. If the sales associate determines that a loaner is appropriate, the sales associate issues a receipt to the customer which may include, for example, a bar code identifying the loaner transaction, a loaner transaction number, a pick up number, the identity of the customer, and the like.

When the loaner transaction is completed on the sales floor at a point-of-sale terminal, the point-of-sale terminal sends a message over the communication channel 102. If the customer must pick up the loaner at the merchandise pick up area, this message causes the in-store processor 112 to control the paging system 116 in order to page an MPU associate by use of the portable display device worn or carried by the MPU associate. This message notifies the MPU associate that the customer will pick up the loaner at the merchandise pick up area near the stock room. Alternatively or additionally, this message causes the work station 108 to display a suitable notice for the MPU associate that a customer will be picking up a loaner.

When the customer arrives at the MPU kiosk 104 in the merchandise pick up area, the customer selects the Loaner button on the screen display 300 which causes the screen display 2700 as shown in FIG. 27 to be displayed to the customer on the touch screen monitor 208. The customer is directed to select whether or not the loaner transaction involves a drop off or a pick up. When picking up a loaner, the customer is requested to enter the customer identification by use of identification screen displays 500–800 described above. A screen display is then presented to the customer which displays the identified loaner and which requests the customer to indicate whether the customer is ready to pick up the displayed loaner item and, if so, to wait while the MPU associate brings the loaner to the customer. When the customer has completed the loaned item selection process, a message is sent to the MPU associate's portable display device and/or to the work station 108. This message includes the loan transaction number, the customer's name, the item description, and the item location, usually the staging area near the merchandise pick up area. A loaner thank you screen display appears allowing the customer to exit the system by touching an OK button. The MPU associate locates the item and delivers it to the customer.

When dropping off a loaner, the customer instead selects the Loaner Return (i.e., DropOff) button on the screen display 2700 and the HFM database of the in-store processor 112 is searched for items which had been loaned to the customer but which have not yet been dropped off (returned). Consequently, a screen display (not shown) is presented to the customer and displays any outstanding loaned items. The customer is requested to select a loaner being dropped off (returned). Thereafter, a message is sent to the MPU associate's portable display unit. A two-part printed slip is produced. One of the parts of this two-part printed slip may be an original and the other may be a carbon copy, or both parts may be original but separate parts containing similar information. One portion of the two-part printed slip is a receipt to indicate that the customer has dropped off (returned) the item. The customer is also presented with a thank you screen display similar to those described above. This thank you screen display verifies the item to be dropped off (returned), indicates that someone will soon retrieve the dropped off (returned) item from the customer, and requests the customer to wait. When the customer touches the OK button on this thank you screen display, the MPU kiosk 104 displays the welcome screen display for the another customer. The receipt portion of the two-part printed slip portion is given by the MPU associate to the customer when the item is received by the MPU associate. The second portion of the two-part printed slip is attached by the MPU associate to the dropped off (returned) item in order to aid in its later identification, if needed. Also, the database of the in-store processor 112 is updated to indicate that the particular Loaner has been returned.

Figure 28A:
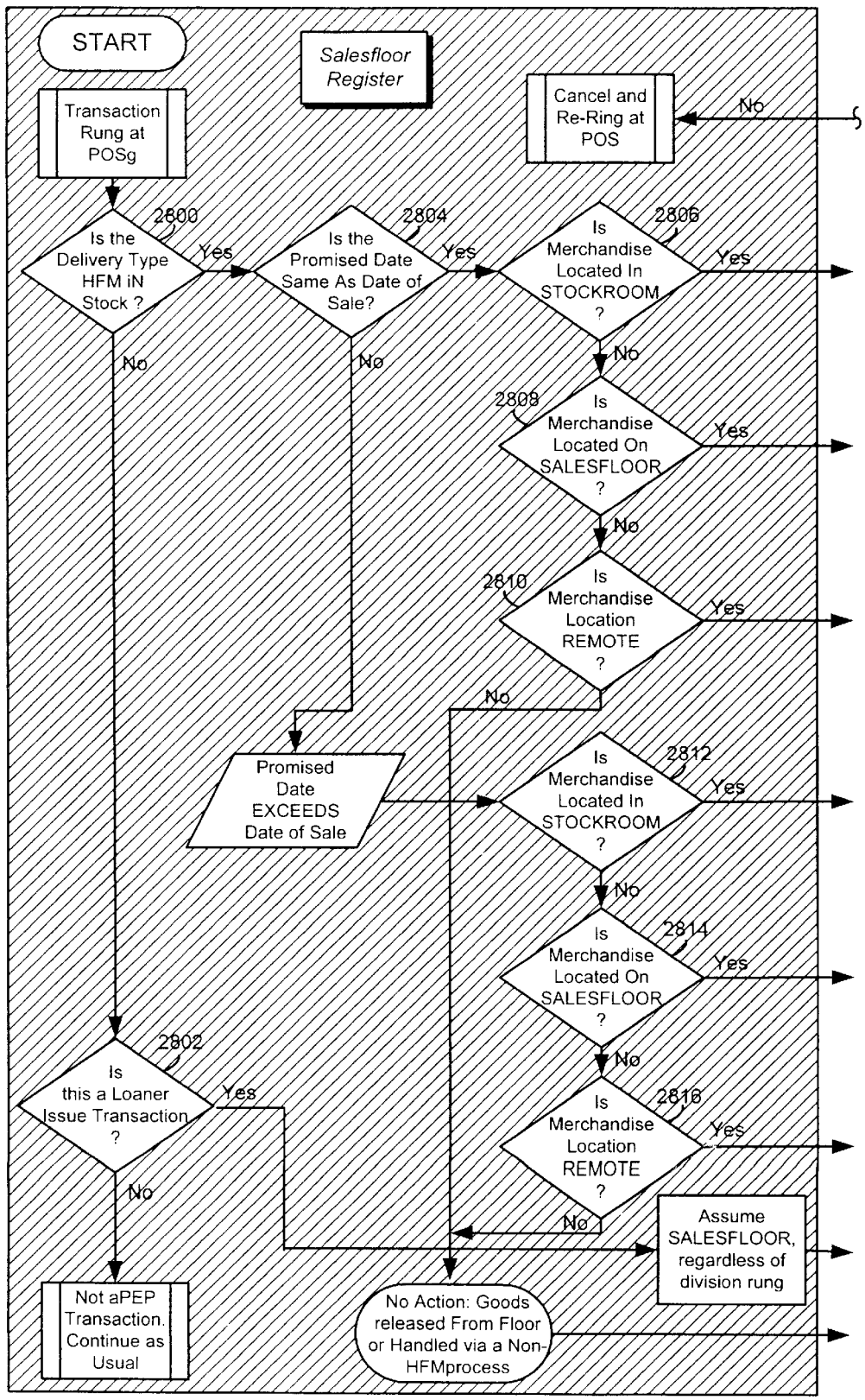
Figure 28B:
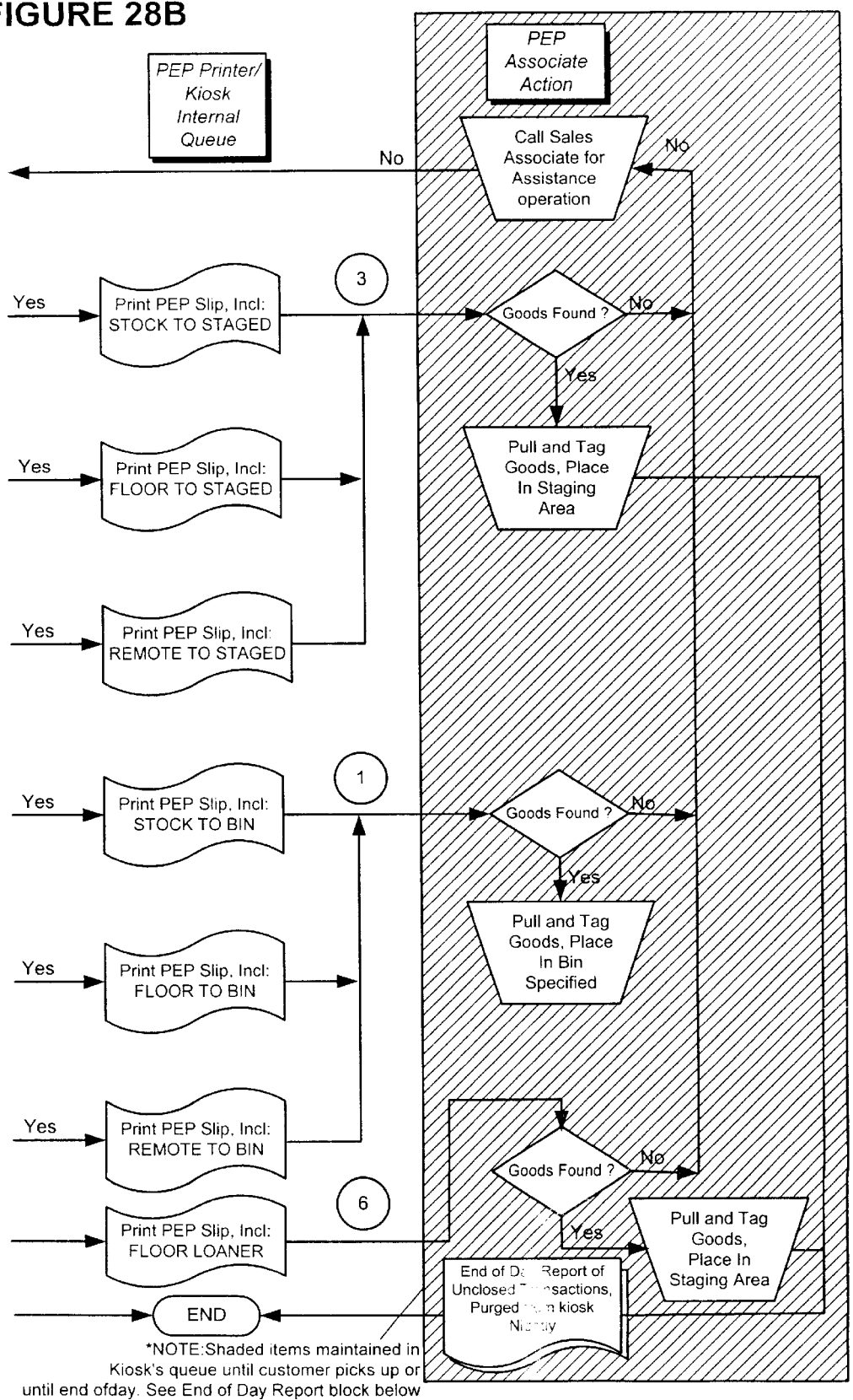

The software and manual operations executed by or at the point-of-sale registers 106₁–106ₙ, the MPU kiosk 104, the work station 108, and the in-store processor 112 are shown by the flow charts of FIGS. 28–36. FIG. 28 presents the procedures which are initiated at the time that a transaction is rung up at a point-of-sale register.

As shown in FIG. 28, at the time that a transaction is rung up at a point-of-sale terminal, a block 2800 determines whether a sales floor associate indicates by operation of the point-of-sale register that the transaction is a hold for merchandise (HFM) transaction. If not, a block 2802 determines whether the sales floor associate indicates by operation of the point-of-sale register that the transaction involves a loaner. If not, the sales room associate proceeds as normal, and goods will be released from the sales floor, if appropriate. Thereafter, the transaction is ended.

If the block 2800 determines by action of the sales floor associate that the transaction involves an HFM transaction, a block 2804 determines whether the promised delivery date for the item is the same as the date of sale. If the delivery date and the date of sale are the same, a block 2806 determines whether the item to be picked up is located in the stock room. This determination can be made either in response to an entry on the point-of-sale register or by a search of the database of the in-store processor 112.

If the item to be picked up is located in the stock room, a MPU printer, such as a printer associated with the work station 108, prints an MPU slip which may be in the form of a tag to be placed on the item to be picked up. This MPU slip also indicates the item to be picked up and the customer and includes a notice that the item is in the stock room and should be staged (because the item is to be picked up that day). The MPU associate must then find the goods (i.e., item). If the goods are found by the MPU associate, the MPU associate pulls the goods, applies the tag (i.e., the MPU slip) to the item, and places the tagged item in a staging area waiting for the customer to pick it up. If the MPU associate is unable to find the goods, the MPU associate calls a sales associate for assistance. If neither the MPU associate nor the sales associate can find the goods, the sales associate cancels the transaction which requires that the transaction be re-rung at a point-of-sale terminal if the customer is still interested in procuring the goods.

The tag, which is placed on the goods, may be used to record a customer's signature, if required, upon pick up of the goods. The tag should reflect sufficient information so that the goods to which it is attached may be easily traced to the original sale. For example, the tag may contain a bar coded transaction ID number for easier recall.

If the block 2806 determines that the item is not located in the stock room, a block 2808 determines whether the item is on the sales floor. If the block 2808 determines that the item is on the sales floor, the MPU printer is directed to print an MPU slip. This MPU slip is essentially the same as that described above except that the notice indicates that the item may be located on the sales floor and should, therefore, be staged from the sales floor. That is, the MPU associate must find the goods on the sales floor. If the goods are found by the MPU associate, the MPU associate pulls the goods, applies the MPU slip to the item, and places this item in the staging area waiting for the customer to pick it up. If the MPU associate is unable to find the goods, the MPU associate calls a sales associate for assistance, as described above.

If the block 2808 determines that the item is not on the sales floor, a block 2810 determines whether the item is at a remote location. A remote location, for example, may be a detached warehouse, a storage trailer, or any other area other than the sales floor or the stock room or other holding area near the merchandise pick up area. If so, the MPU printer prints an MPU slip which notifies the MPU associate to find the indicated item at the remote location and to place the item in the staging area. The MPU associate must then find the goods at the remote location. The goods, if found, should be tagged with the MPU slip and placed in the staging area. If the goods are not found, a sales associate is notified, as described above.

If the block 2810 determines that the item is not at a remote location, the goods must be handled by way of a non-hold for merchandise process, and the transaction is ended.

If the block 2804 determines that the delivery date and the date of sale are not the same, blocks 2812, 2814, and 2816 perform the same tests as the blocks 2806, 2808, and 2810, and the actions following the blocks 2812, 2814, and 2816 are essentially the same as the actions following the blocks 2806, 2808, and 2810. However, instead of placing the goods in the staging area for same day pick up, the goods, if found, are placed in a storage bin awaiting the day on which the goods are to be picked up. The number of the bin in which goods are placed is a default bin number (for example, the last digit of a sales check number) assigned at a point-of-sale terminal and printed on the MPU slip. The bin number, however, may be changed from the default bin number to a bin number assigned at the point-of-sale register during the sale or by any other means.

If the block 2802 determines that the transaction is a loaner transaction, it is assumed that the loaner is on the sales room floor, and the MPU printer prints an MPU slip notifying an MPU associate to find the indicated loaner on the sales floor. The MPU associate must then find the goods on the sales floor. If the goods are found, the MPU associate applies the MPU slip to the loaner and returns the goods to the staging area. If the MPU associate is unable to find the goods, the MPU associate calls a sales associate for assistance.

Figure 29:
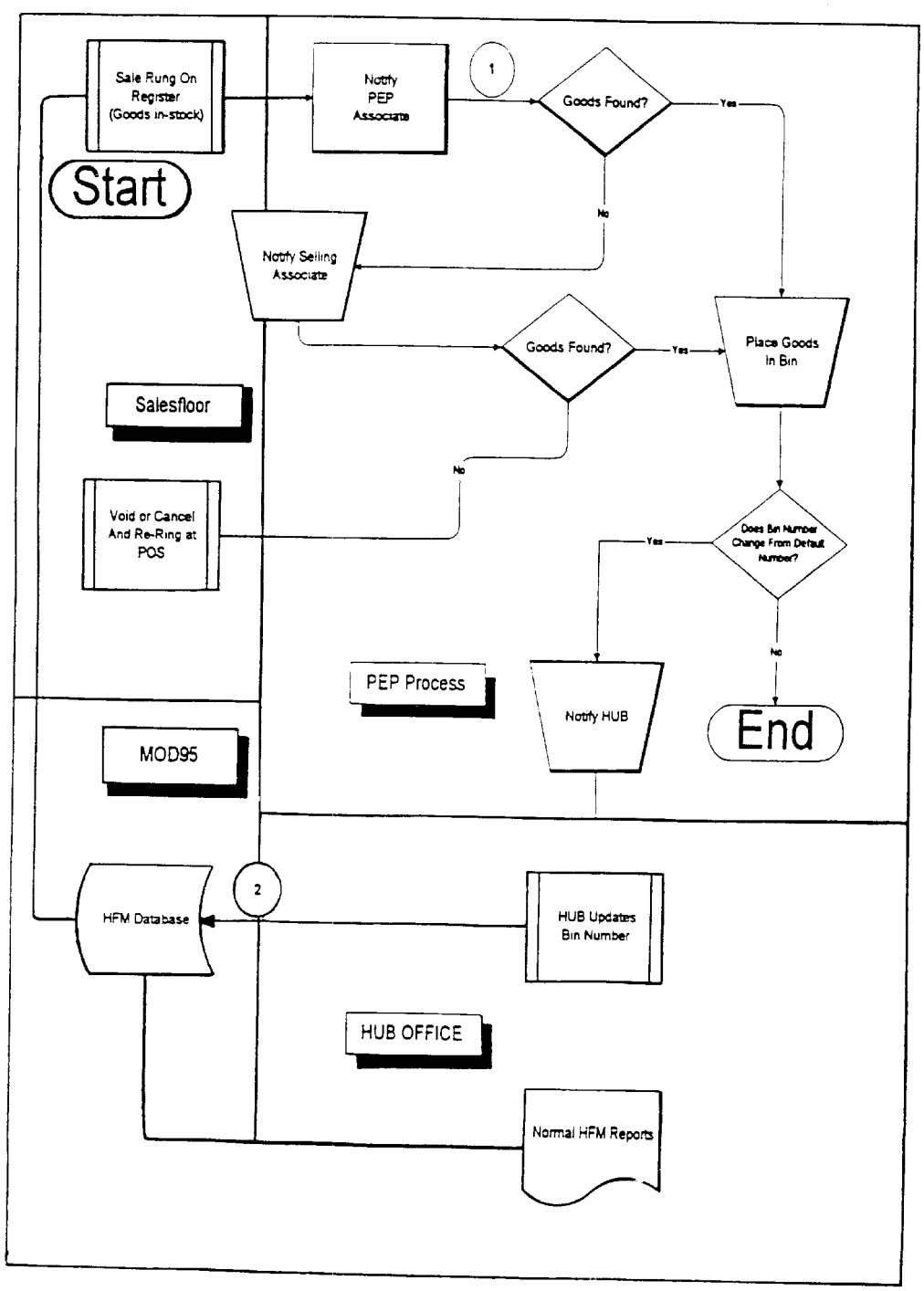

FIG. 29 illustrates the procedures which are followed involving the bin number assigned to an item which is sold as an HFM sale but which is not to be picked up on the day of sale. Accordingly, a sale is rung on a point-of-sale register which causes a message to be sent over the communication channel 102 to the MPU associate's portable display device and/or the work station 108. If the MPU associate is able to find the goods in response to this message, the MPU associate places the goods in the appropriate bin. If the number of this bin is the default bin number, the process ends. If the bin number has been changed, however, a message is sent over the communication channel 102 by a work station, such as the hub register 118 in the HUB office, updating the bin number and sending a corresponding message over the communication channel 102 to the HFM database in the in-store processor 112 so that the HFM database is likewise updated.

If the MPU associate is unable to find the goods, the MPU associate notifies a sales associate by causing an appropriate message to be transmitted by telephone or over the communication channel 102 or otherwise. The sales associate then attempts to find the goods either alone or in concert with the MPU associate. If the goods are found, the MPU associate places the goods in the bin, as before. If the goods cannot be found, the sales associate voids or cancels the HFM sale at a point-of-sale register $106_1$–$106_n$. The cancellation of this process causes the point-of-sale register $106_1$–$106_n$ to transmit an appropriate message over the communication channel 102 to the HFM database stored in the in-store processor 112 so that the HFM database is updated.

Figure 30A:
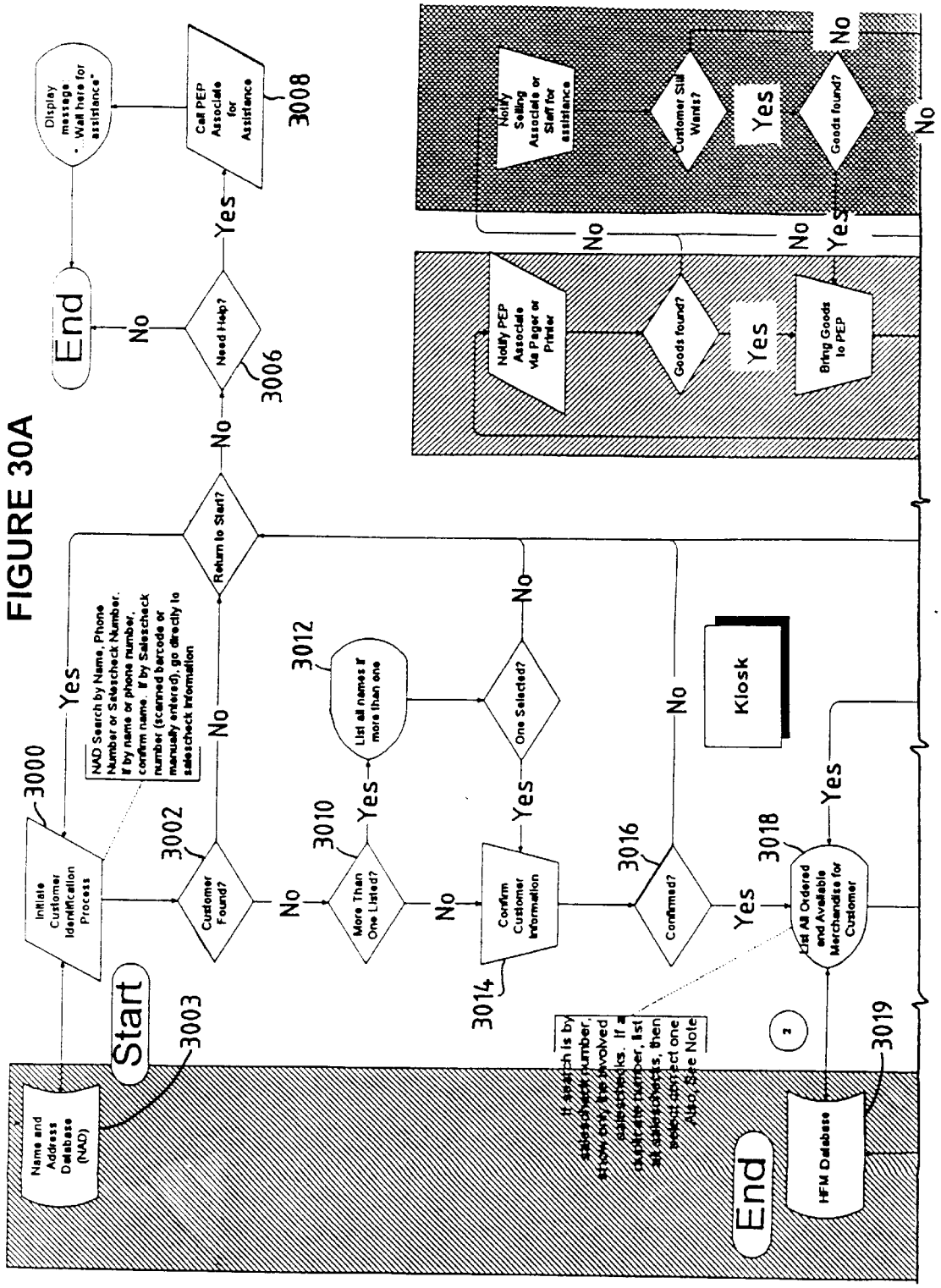
Figure 30B:
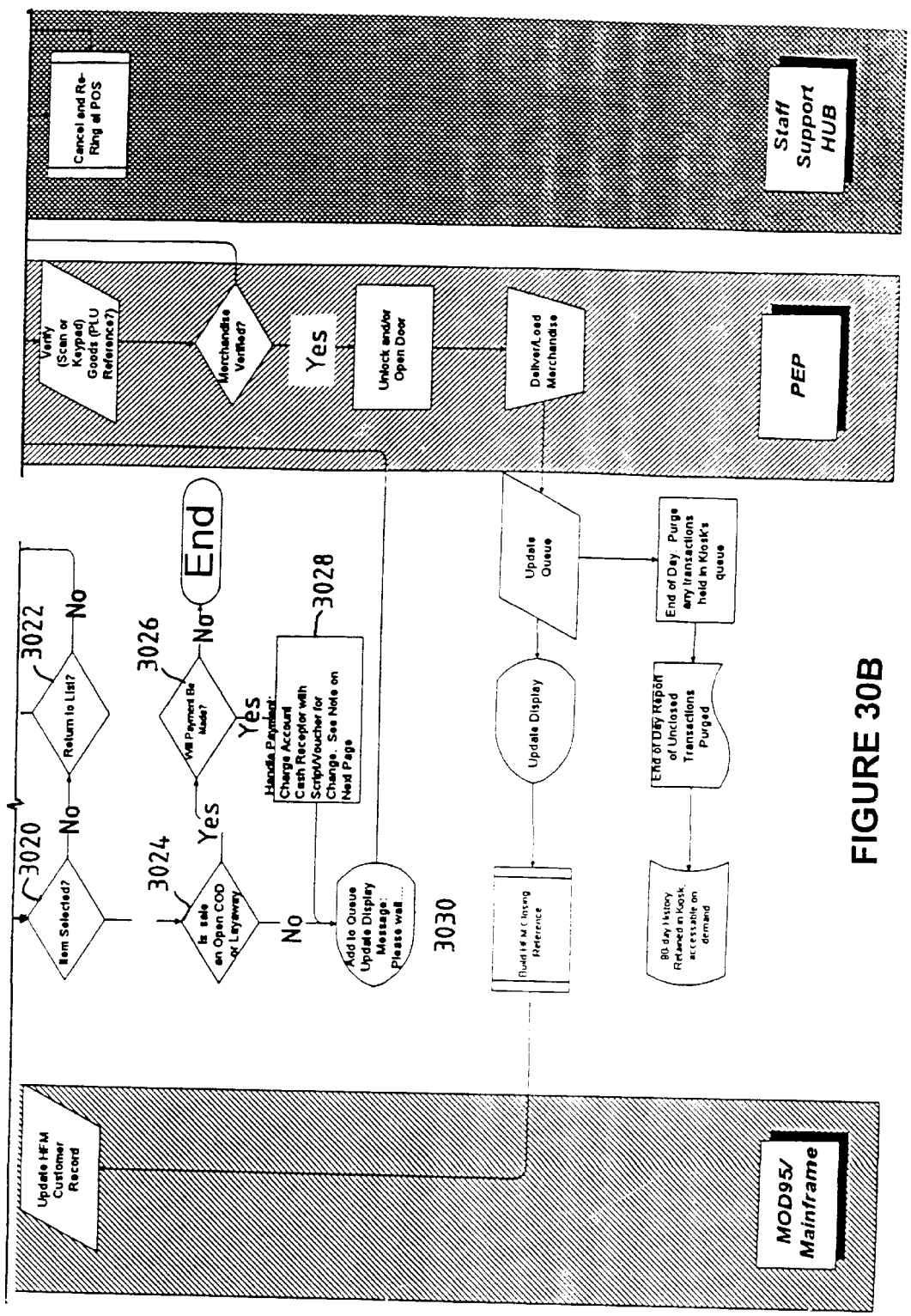

When an HFM item is to be picked up by use of the MPU kiosk 104, the procedure illustrated in FIG. 30 is followed. This procedure starts at the MPU kiosk 104 when the customer touches the start area on the welcome screen display. A block 3000 causes the screen displays 500–800 to be presented by the MPU kiosk 104 to the customer. If the customer uses the screen display 600 or the screen display 700 and if a block 3002 determines that the customer is not found in the name and address database stored in the in-store processor 112 (designated here as a name and address database 3003), flow proceeds to a block 3004. The block 3004 determines whether the customer wishes to return to the block 3000 as indicated, for example, when the customer touches the OK button on the screen display 900, when the customer touches an appropriate Go Back button, or when the customer touches the Menu button on any of the screen displays 500–800 in order to return to the main menu screen display 300.

If the customer chooses not to return to the block 3000, a block 3006 determines whether the customer has requested help such as by touching the Help button on the screen display 900. If so, a message is sent from the MPU kiosk 104 over the communication channel 102 to the MPU associate's portable display device and/or the work station 108 requesting assistance from the MPU associate. At the same time, the screen display 1000, or a similar screen display, is displayed on the touch screen monitor 208 of the MPU kiosk 104 notifying the customer that the MPU associate will assist the customer. If the block 3006 determines that the customer has not requested help, or after the message requesting the customer to wait for the MPU associate is displayed, the procedure ends. For example, if the customer touches the OK button on the screen display 900 or 1000, the procedure ends and the touch screen monitor 208 returns to the welcome screen.

If the block 3002 determines that the customer is found in the name and address database 3003, a block 3010 determines whether there is more than one person having the customer's name or at the customer's telephone number, or the like, in the name and address database 3003. If so, a block 3012 presents a list of the names to the customer and requests the customer to select one. For example, the block 3012 lists the names of on a screen display like the screen display 1800.

If the customer does not select a name from this list, flow returns to the block 3004. If the customer selects a name, however, or if the block 3010 determines that there is only one name on the list, a block 3014 requests the customer to confirm the selected and/or listed name. Thereafter, a block 3016 determines whether or not the customer has confirmed the identification. If not, flow returns to the block 3004. If there is confirmation, a block 3018 accesses the HFM database (designated here as an HFM database 3019) in order to list those items available to be picked up. The screen display 3018 causes those items to be displayed on the touch screen monitor 208.

Although not shown in FIG. 30, if the customer uses the screen display 500 or the screen display 800 at the block 3000, the blocks 3010–3016 are skipped and the HFM database 3019 is searched on the basis of the sales check number, and the block 3018 causes only the items covered by the sales check to be displayed to the customer. Thus, if the search for the customer identification is by sales check number, the block 3018 shows only the items covered by the sales check. Otherwise, all items which have been purchased and/or ordered by the customer for pick up, but which have not yet been picked up by the customer, are presented on the touch screen monitor 208 of the MPU kiosk 104. These items may be presented, for example, by the screen display 1200. As indicated by the screen display 1200, the customer is requested to select one of the items displayed.

A block 3020 determines whether the customer has selected an item. Until the customer selects an item, a block 3022 preserves the list on the touch screen monitor 208. Otherwise, the block 3022 determines that the customer does not want to return to the list. If not, flow returns to the block 3004.

If the block 3020 determines that the customer has selected an item, a block 3024 determines whether the sale involving that selected item is an open COD type of sale or a layaway. If the sale is an open COD sale or a layaway, a block 3026 determines whether the customer chooses to make a payment by presenting to the customer the payment screen displays as discussed above. If the customer chooses not to pay, the kiosk transaction is ended. If the customer chooses to make a payment, a block 3028 processes the customers selections on the payment screen displays.

After the payment screen displays are completed by the customer, or if the pick up transaction does not involve item of an open COD sale or a layaway as determined by the block 3024, a message to be transmitted over the communication channel 102 to an MPU associate's portable display device and/or to the work station 108 which both notifies the MPU associate that an item is to be picked up and adds the customer to the Waiting section of the customer display 110. Also, the screen display 1300 is displayed to the customer. When the customer touches the OK button on the screen display 1300, the kiosk 104 is returned to the welcome screen display.

If the item is found by the MPU associate, the MPU associate brings the item to the work station 108 and verifies, such as by using a scanner or key pad at the work station 108, that the item is the correct item to be delivered to the customer. If the item is verified, a door to the merchandise pick up area is unlocked, and the MPU associate is permitted to deliver the item to the customer.

The customer display 110 viewable by the customer is also updated to indicate that the MPU associate has found the items and is in the process of delivering the items to the customer. The completed transaction is transmitted by the work station 108 to the in-store processor 112 over the communication channel 102 so that the HFM database 3019 may be updated. The customer display 110 may be arranged, for example, to display an identification of each of the customers waiting for items to be delivered to them by an MPU associate. This display may list the customers in the order in which the customers used the MPU kiosk 104 and is updated as the MPU associate finds and delivers items by moving the customer's name to the Now-Serving section of the customer display 110. As the name of each new customer is added to the Now-Serving section of the customer display 110, the names currently in this section are scrolled and eventually drop off of the customer display 110 altogether. If the goods cannot be found or verified by the MPU associate, the assistance of a sales associate or other staff member is requested. If the customer no longer wants the goods, or if the goods still cannot be found, the sale is canceled.

Figure 31A:
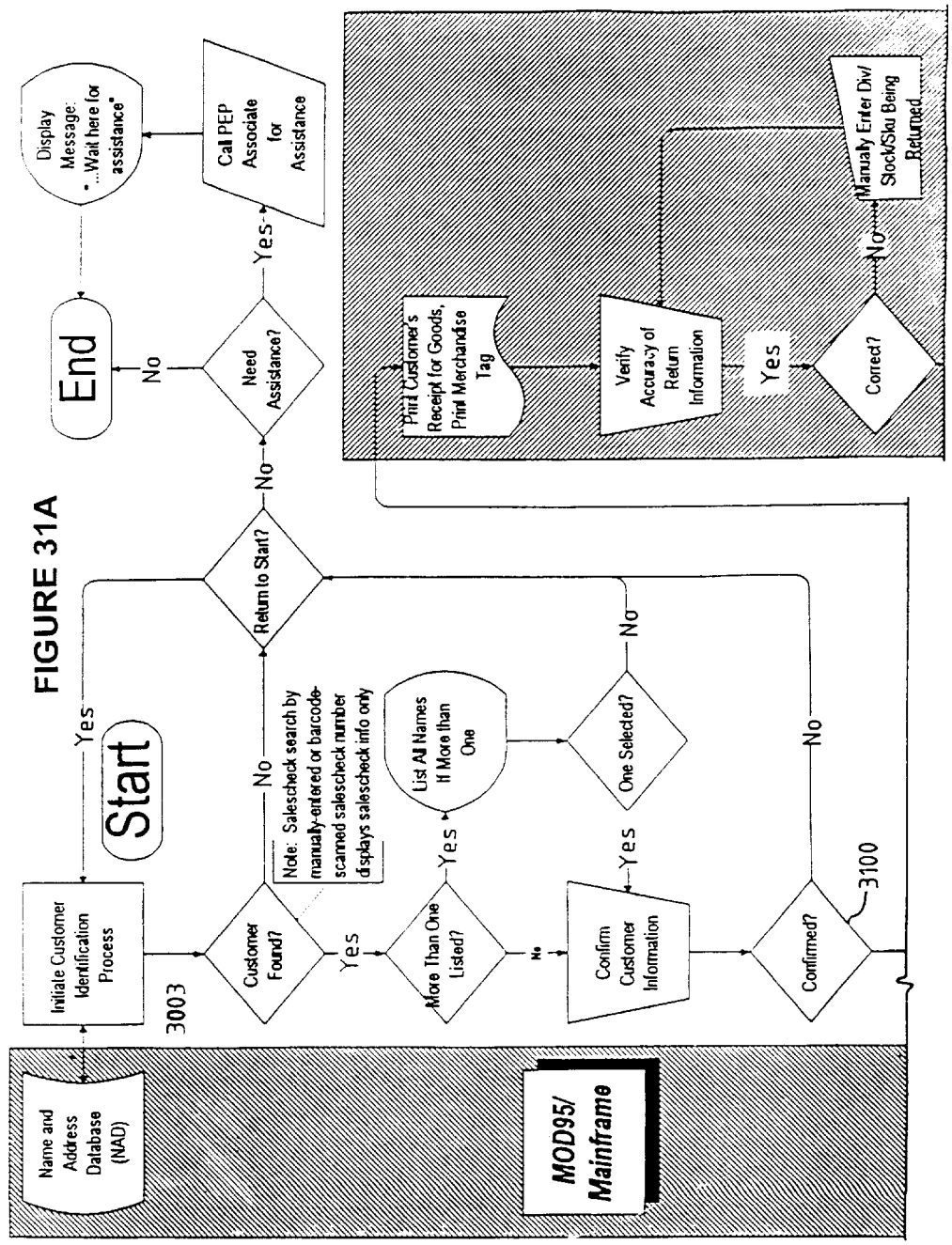
Figure 31B:
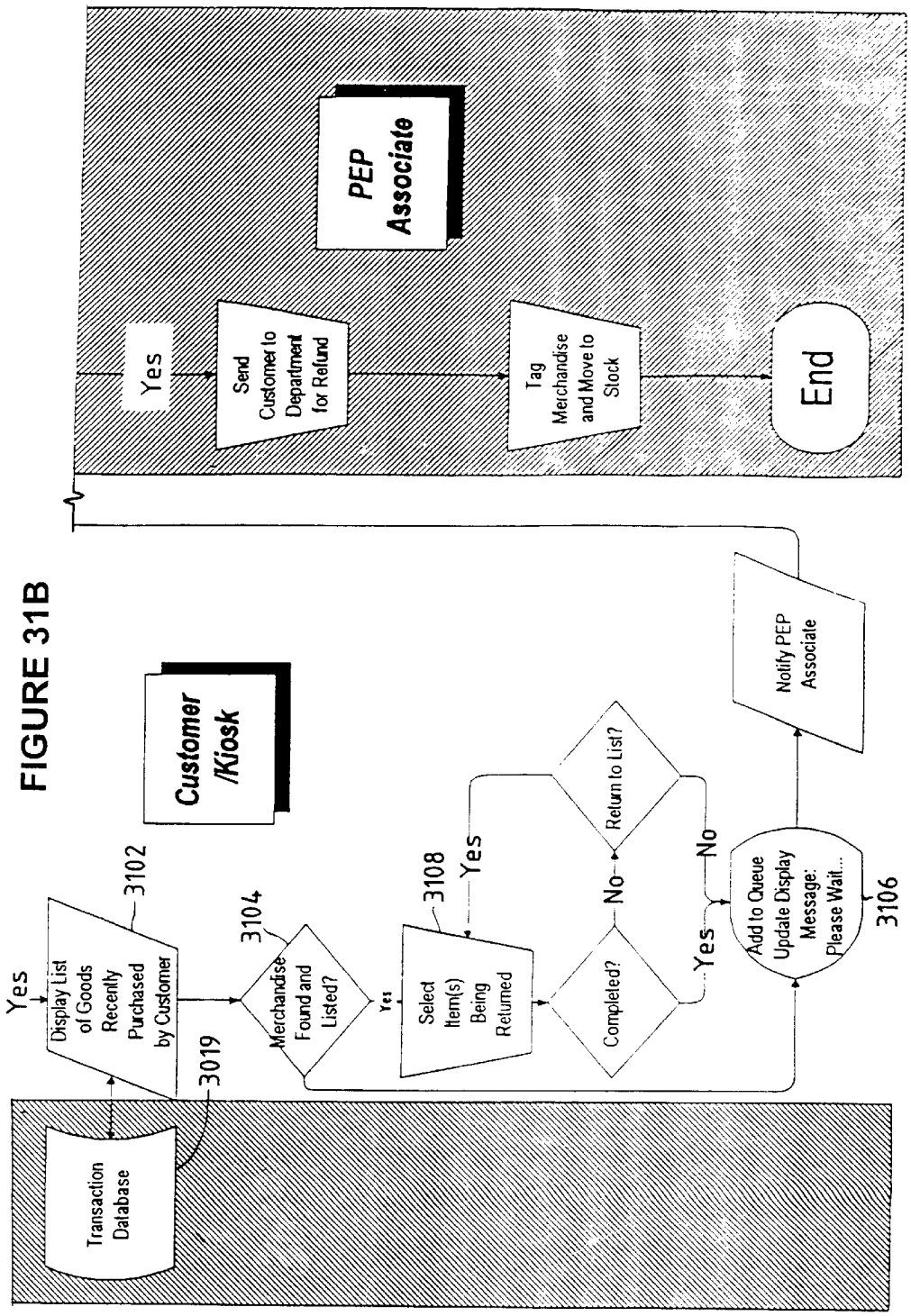

A return of an item by use of the MPU kiosk 104 is processed in a similar manner according to the procedure shown in FIG. 31. This procedure again is initiated by the customer when the customer touches the start area on the welcome screen display. Thereafter, the customer selects the Merchandise Return button on the screen display 300. The process of identifying the customer is the same as it is in connection with FIG. 30 and, therefore, is not also described here. If a block 3100 determines that the customer's identification is confirmed, a block 3102 accesses the HFM database 3019 in order to list those items recently purchased by the customer. The block 3102 causes those listed items to be displayed on the touch screen monitor 208 by the screen display 1400. (Although not shown in FIG. 31, if the customer uses the screen display 500 or the screen display 800, the customer search blocks are skipped, the HFM database 3019 is searched on the basis of the sales check number, and the block 3102 causes only the items covered by the sales check to be displayed to the customer.)

If the item to be returned is not found and displayed by the screen display 1400, the block 3102 presents the screen display 1500 and subsequent screen displays as described above to permit the customer to identify the item to be returned by different means. A block 3104 determines whether the item to be returned is displayed by the block 3102. If this item is not found as indicated by the customer when, for example, the customer touches a Help button on a three way exit screen display following the UPC screen display, a block 3106 transmits a request for assistance message to the MPU associate.

If items are on the list and are presented on a screen display, a block 3108 permits the customer to select those of the displayed items to be returned, and causes the screen display 1600, as well as the screen displays subsequent to the screen display 1600, as described above, to be presented to the customer. The customer completes all return transactions using these screen displays and, until all of the return transactions for this customer are completed, the flow returns to the block 3108. When all of the return transactions for this customer are completed, the block 3106 causes a thank you screen display to be displayed to the customer. Also, the block 3106 causes a message to be transmitted over the communication channel 102 to an MPU associate's portable display device and/or to the work station 108 which both notifies the MPU associate that an item is to be returned and adds the customer to the Waiting section of the customer display 110. The work station 108 causes both a receipt and a tag to be printed and verifies the accuracy of the return information. If the accuracy of the return information provided by the customer is not correct, the MPU associate must manually enter the relevant information on the customer's receipt. Once the information, which is either provided by the customer or by the MPU associate, is determined to be correct, the MPU associate retrieves the returned item from the customer, delivers the receipt to the customer, and sends the customer to a point-of-sale register for a refund, if appropriate. The MPU associate also applies the tag to the item and moves the item to the stock room.

Figure 32:
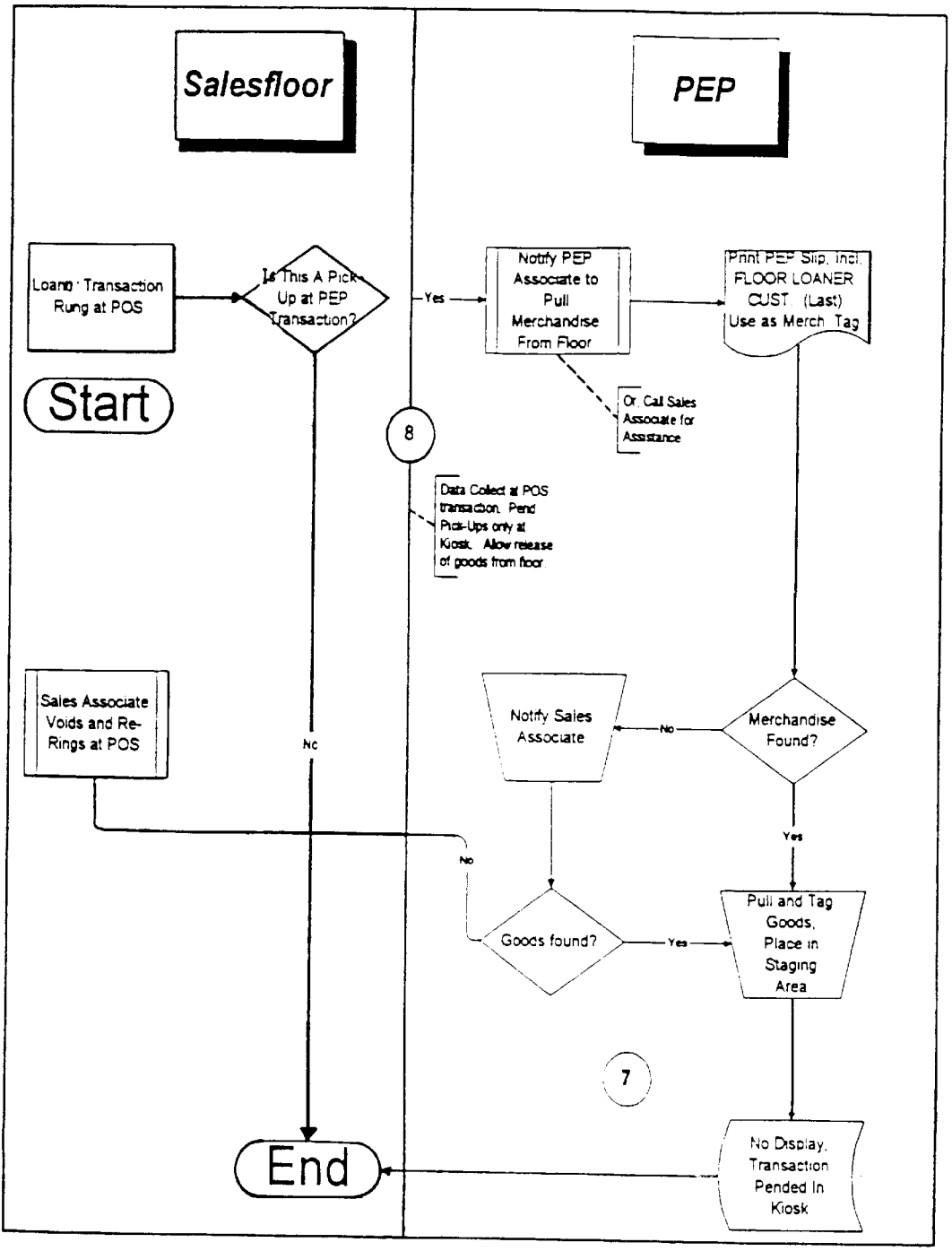

FIG. 32 illustrates in more detail the procedures followed when a loaner is reserved by a customer at a point-of-sale register 106$_1$–106$_n$. The sales associate indicates on a point-of-sale register 106$_1$–106$_n$ that a transaction is a loaner transaction. The sales floor associate also determines whether or not the loaner is to be picked up at the merchandise pick up area. If not, the loaner is made from the sales floor, and the process ends.

If the loaner is to be picked up at the merchandise pick up area, the pertinent point-of-sale register 106$_1$–106$_n$ transmits an appropriate message over the communication channel 102 to the work station 108 and/or to the paging system 116 through the in-store processor 112 in order to notify the MPU associate that a customer will be picking up a loaner. Also, the work station 108, in response to this message, causes an MPU slip to be printed which includes the customer's last name and a statement that the transaction is a loaner transaction. If the MPU associate finds the item, the MPU associate pulls the item and applies the tag thereto. Then the MPU associate places the goods in the staging area waiting for the customer to pick it up. If the item is not found, the MPU associate notifies a sales associate who helps in the search for the goods. If the sales associate cannot find the goods, the sales associate voids the loaner transaction. Finally, the loaner information, including the loaner transaction number, is held in the MPU kiosk 104.

Figure 33A:
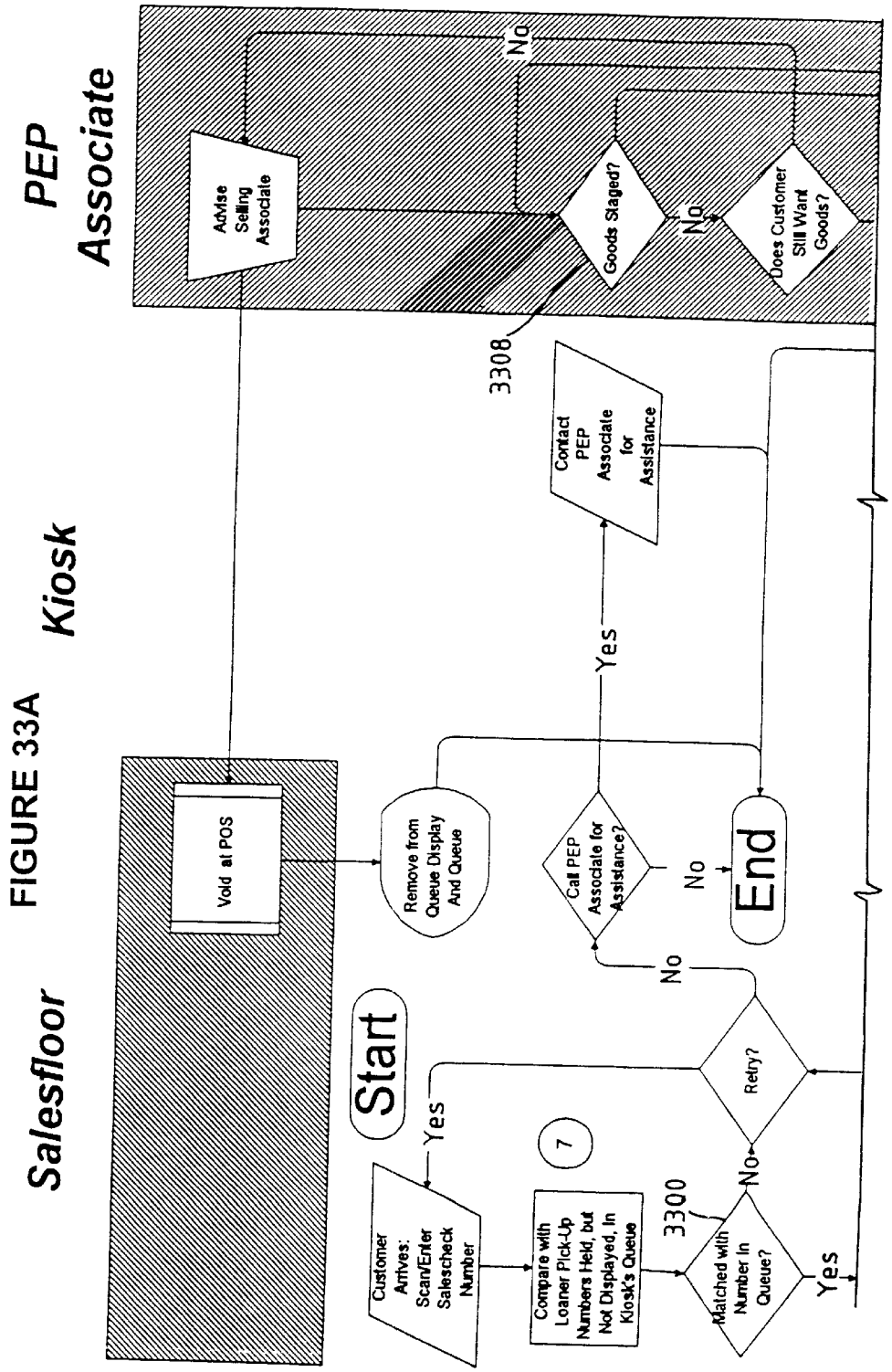
Figure 33B:
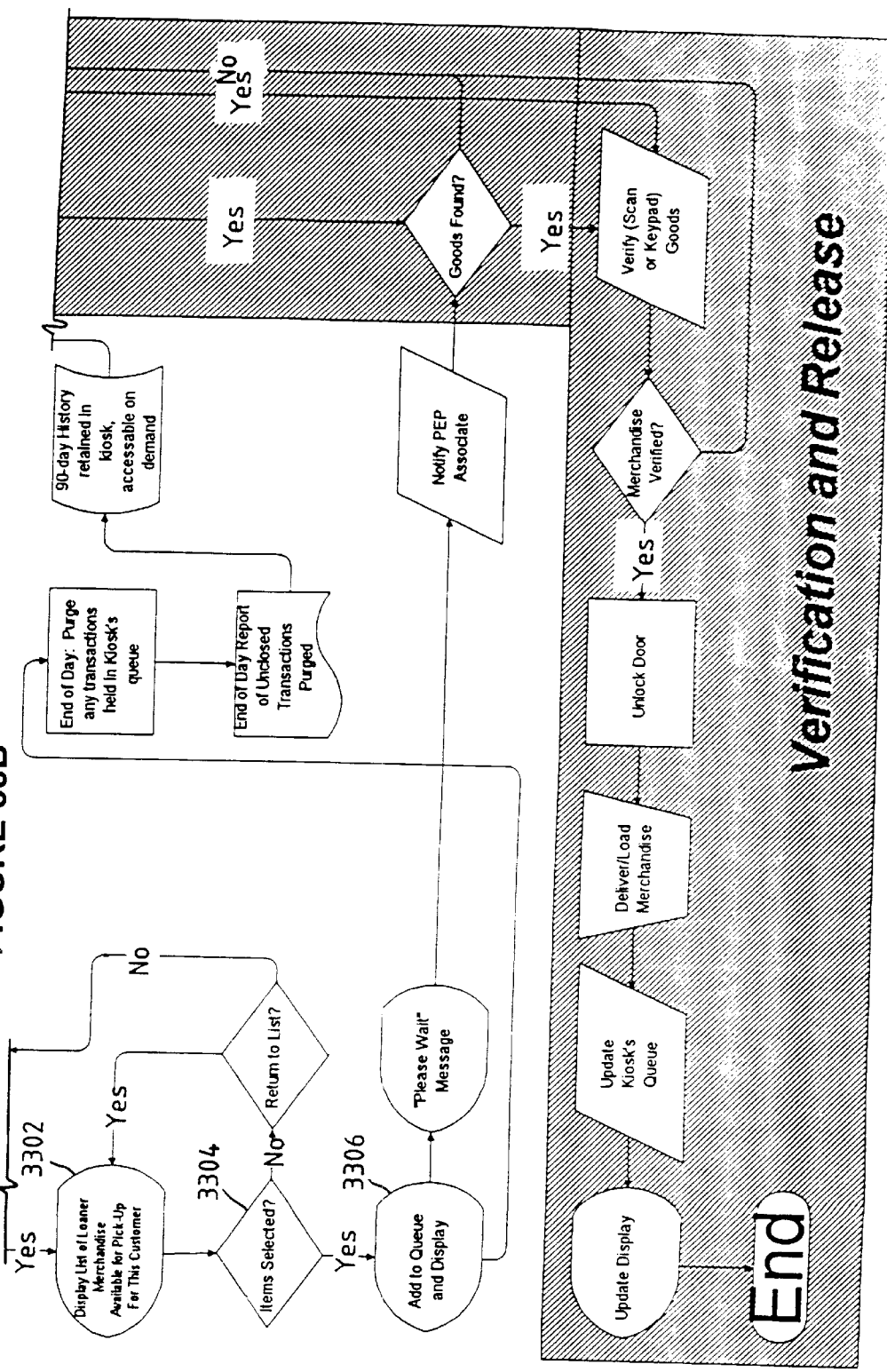

FIG. 33 shows the procedure followed when the customer appears at the MPU kiosk 104 to initiate the pick up of the loaner. The customer starts the loaner pick up process by touching the start area on the welcome screen display, touching the Loaners button on the screen display 300, touching the Loaner Pickup button on the screen display 2700, and enters the appropriate identification information, such as the loaner transaction number, on the identification screen displays. The MPU kiosk 104 then compares the loaner to be picked up by the customer to the loaner information held in the memory of the MPU kiosk 104. If a block 3300 determines that the loaner to be picked up by the customer matches one of the loaners stored in the memory of the MPU kiosk 104, a block 3302 displays the identified loaner and requests the customer to indicate whether the customer is ready to pick up the displayed loaner item by selecting the displayed loaner. If the loaner to be picked up does not match one of the loaner numbers stored in the memory of the MPU kiosk 104, or if the customer does not select a displayed loaner as determined by a block 3304 and does not want to return to the listed loaners, the customer either retries the entry, or asks that an MPU associate be called for assistance, as appropriate and desired. If the MPU associate is called for assistance, a message is sent by the MPU kiosk 104 over the communication channel 102 which causes either the MPU associate's portable display device and/or the work station 108 to notify the MPU associate that assistance is required. Thereafter, the process ends.

If the block 3304 determines than a loaner has been selected from the display, a block 3306 presents a thank you screen display to the customer and sends a message from the MPU kiosk 104 over the communication channel 102. In response to this message, the Waiting section of the customer display 110 is updated, and the MPU associate is notified as described above. If the MPU associate finds the loaner, the MPU associate verifies the loaner by scanning, for example, a bar code of the MPU slip previously applied to the item. If the loaner is verified, the door to the merchandise pick up area is unlocked, and the MPU associate delivers the loaner to the customer. At the same time, the work station 108 moves the customer's name from the Waiting section to the Now-Serving section of the customer display 110. If the loaner cannot be found, or if the loaner is not verified, flow proceeds to a block 3308 which determines whether the loaner has been staged. In other words, the MPU associate double checks to make sure that the item is indeed not in the stock room or staging area. If the loaner is staged, the MPU associate is again requested to verify the loaner. If the loaner is not staged, but the customer no longer wants the goods, a sales associate is notified and voids the transaction at the point-of-sale terminal. Thereafter, the customer's name is removed from the cue, and the process ends.

Figure 34A:
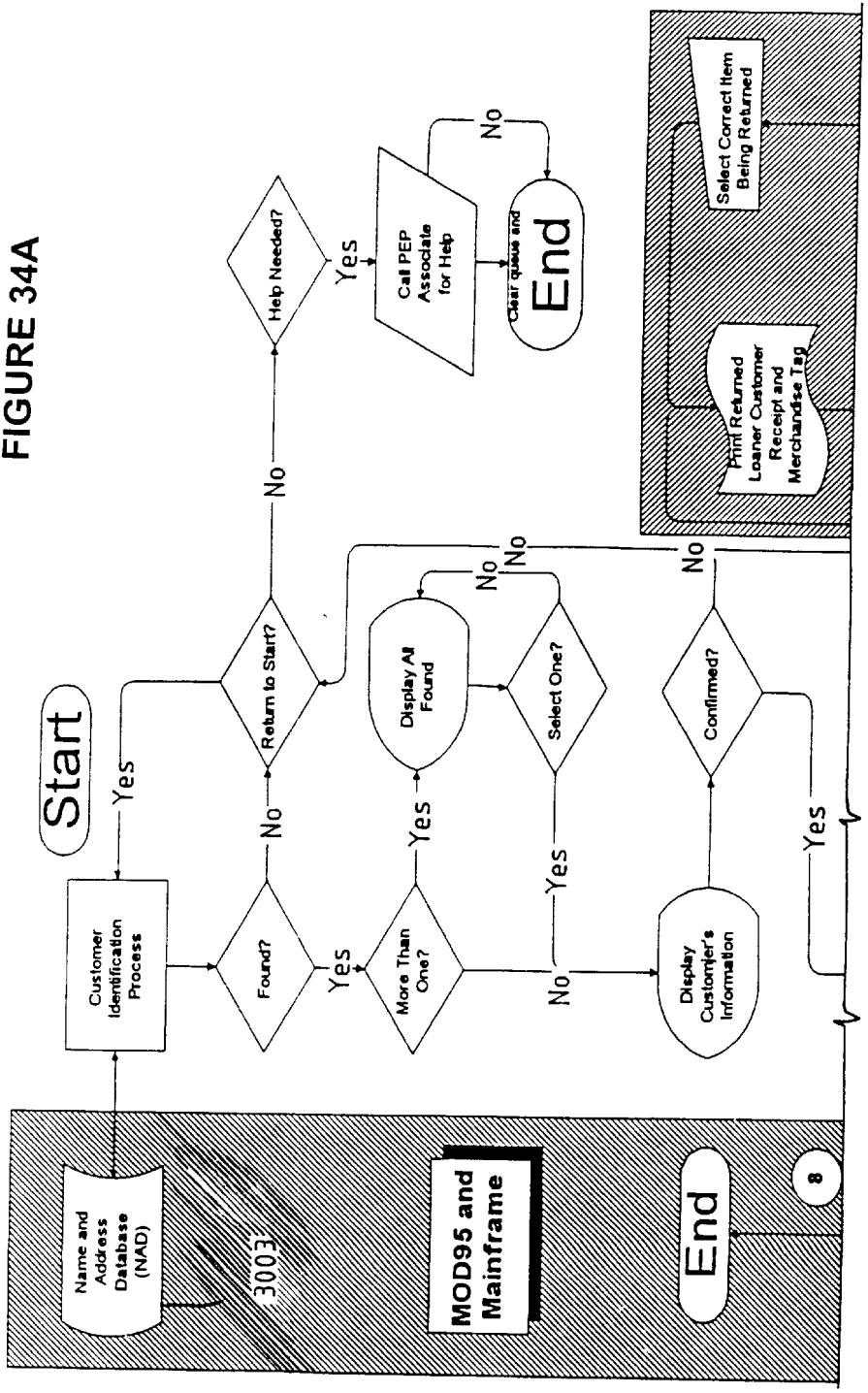
Figure 34B:
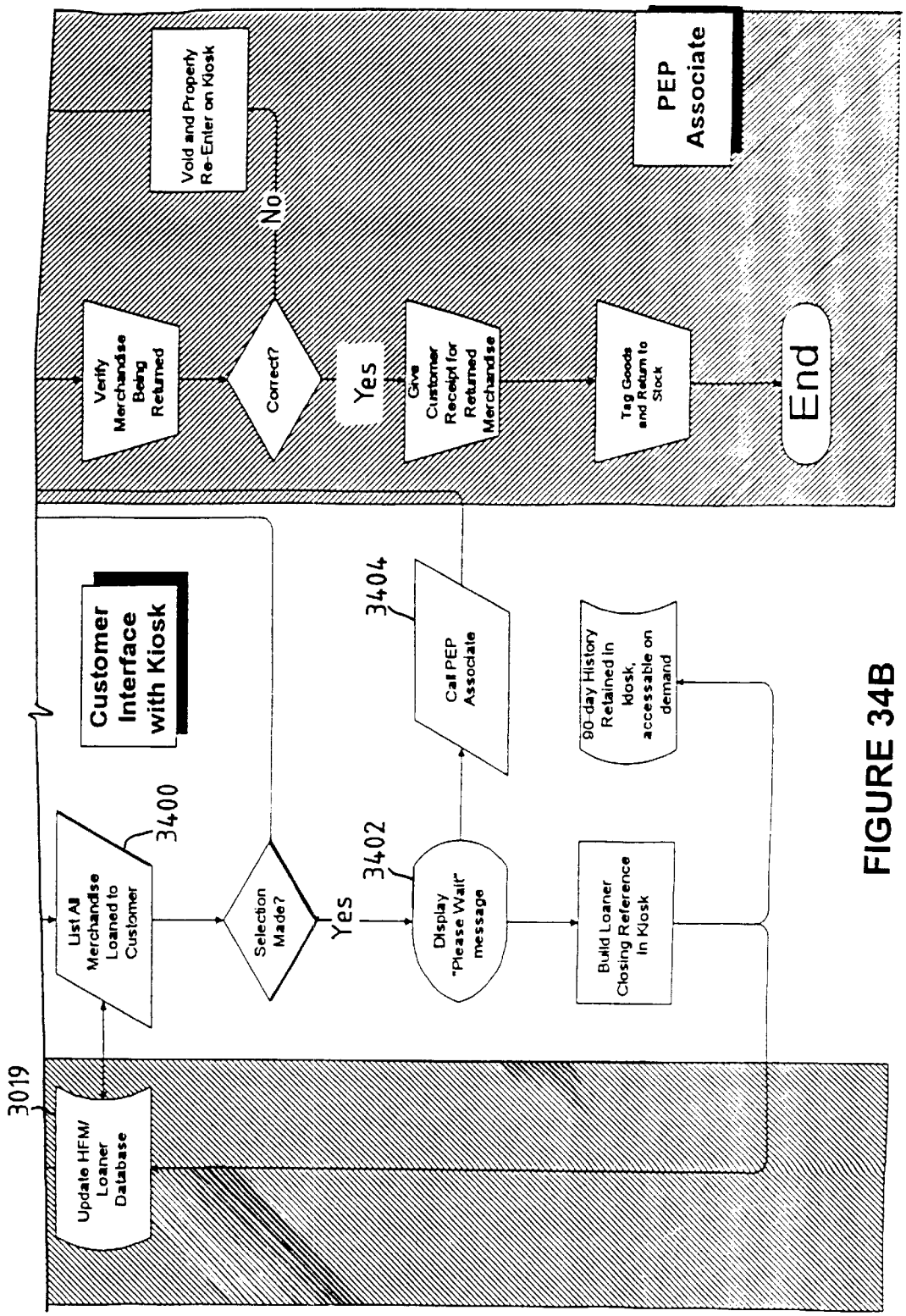

FIG. 34 shows the procedure followed when the customer appears at the MPU kiosk 104 to initiate the drop off (return) of a loaner. The customer starts the loaner drop off (return) process by touching the start area on the welcome screen display, touching the Loaners button on the screen display 300, touching the Loaner Return button on the screen display 2700, and enters the appropriate identification information on the identification screen display s as in the case of the other transactions. If the customer is found in the name and address database 3003 and the customer confirms the displayed identification information, a block 3400 accesses the HFM database 3019 and causes a list of the products loaned to the customer to be displayed on the touch screen monitor 208 of the MPU kiosk 104.

The customer is requested to select in this display one or more of the items to be dropped off (returned). If the customer does not select an item, the customer is asked to indicate whether the customer wishes to start the process over again, or whether the customer needs help. If the customer makes a selection, a block 3402 causes a thank you screen display similar to those described above to be displayed to the customer. This thank you screen display verifies the item to be dropped off (returned), indicates that someone will soon retrieve the dropped off (returned) item from the customer, and requests the customer to wait. A block 3404 also causes a message to be transmitted over the communication channel 102 to the work station 108 and/or the in-store processor 112 in order to notify (i.e., call) the MPU associate that a customer is dropping off (returning) a loaner. The work station 108 causes a label tag to be printed, and the MPU associate is required to verify the item being dropped off (returned). If the item is verified, the MPU associate gives the customer the receipt portion of the label tag and applies the remaining portion of the label tag to the goods which are then returned to stock. Also, the in-store processor 112 database is updated to indicate that the loaned item has been returned to the store.

Figure 35A:
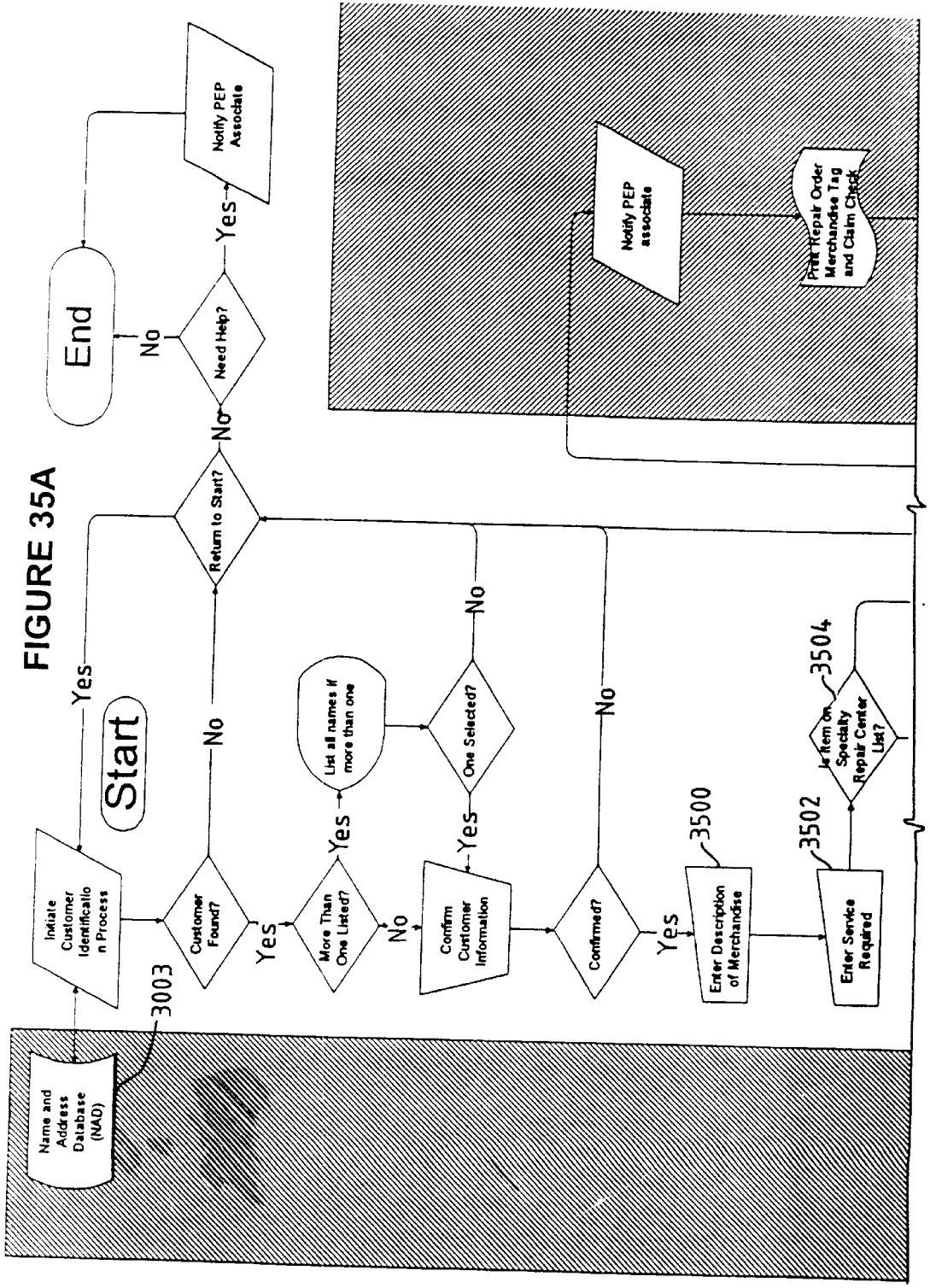
Figure 35B:
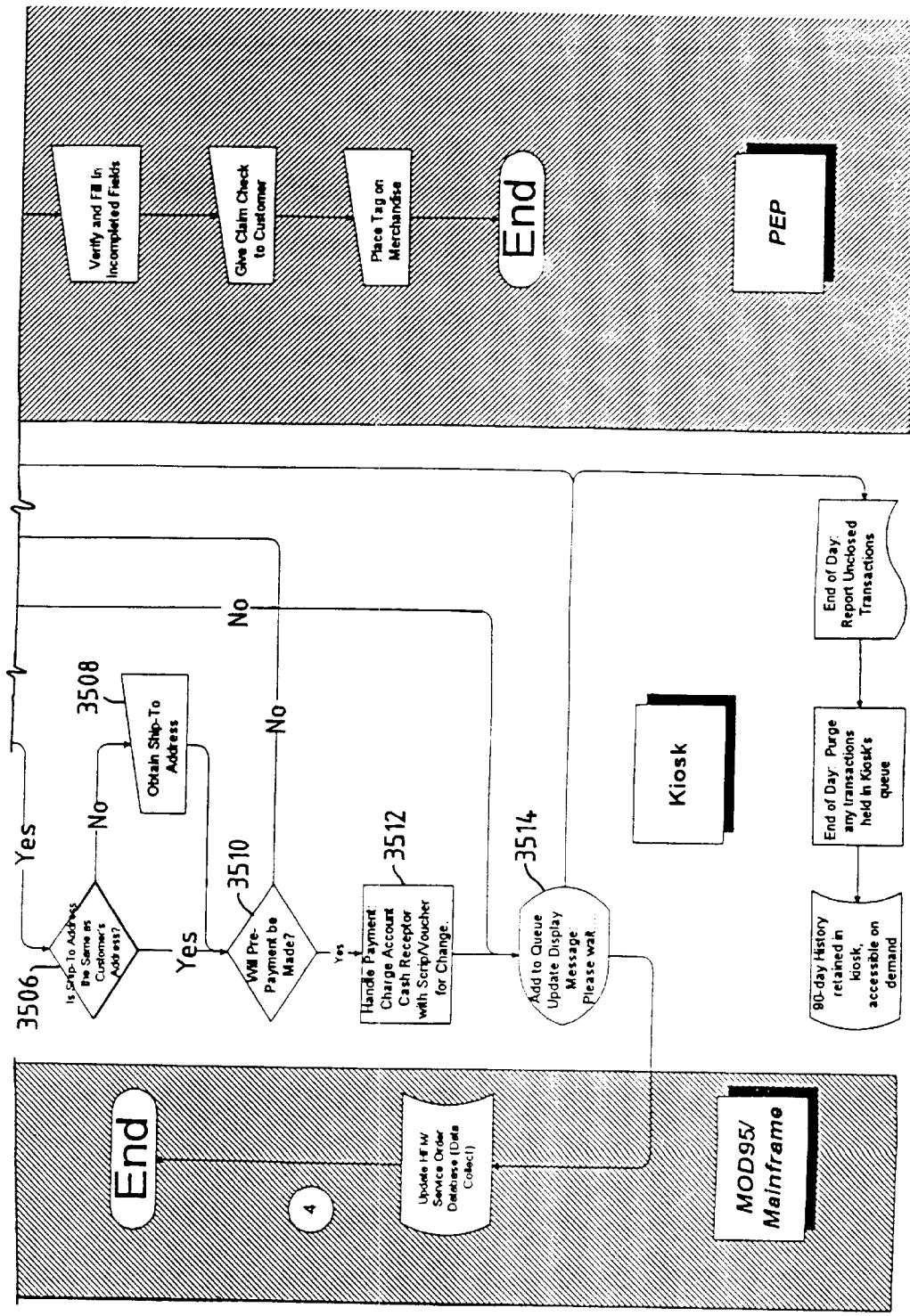

If a customer is dropping off an item to be repaired, the procedure shown in FIG. 35 is implemented. A repair drop off process is initiated by the customer touching the start area on the welcome screen display presented on the touch screen monitor 208 of the MPU kiosk 104. The customer then touches the Repair & Service button of the screen display 300, and the Repair Drop-off button of the screen display 1700. The identification screen displays are presented to the customer and, as before, if the customer confirms the identification information presented to the customer on the touch screen monitor 208, a block 3500 presents the customer with the screen displays 1900–2000 which allow the customer to describe the item, as discussed above.

A block 3502 then presents the customer with the screen display 2100 and any related screen displays which allow the customer to indicate the reason for the repair. A block 3504 then determines whether the item for repair is the type of item which must be sent out to a remote repair facility (i.e., a specialty repair center). If the item for repair must be sent out to a remote repair facility, a block 3506 presents the customer with the screen display 2200, which displays the customer's address, and requires the customer to indicate whether the shipping address is correct. If the customer's address is incorrect, a block 3508 directs the customer to enter the correct address. If the original address is correct, or after the customer enters the correct address, a block 3510 presents the customer with the payment screen displays, including the screen displays 2300–2500, and determines whether pre-payment will be made. If pre-payment will be made, a block 3512 processes these screen displays, as described above.

If the item for repair can be repaired locally as determined by the block 3504 and that prepayment is not required, or after the block 3512 processes the payment screen displays if prepayment is required, a block 3514 presents the customer with a thank you screen display. This thank you screen display requests the customer to wait while an MPU associate is notified to pick up the item to be repaired. The block 3514 also causes a message to be transmitted over the communication channel 102. This message causes the MPU associate to be notified by the paging system 116 and/or causes the work station 108 to display a suitable notice to the MPU associate. Also, the MPU printer prints an MPU slip in the form of a claim check and repair order label tag to be printed. The MPU associate verifies and fills in any uncompleted fields in this label tag and gives the customer the claim check portion. The remaining repair order portion of the label tag is attached to the item to be repaired. The HFM database is also updated.

Figure 36A:
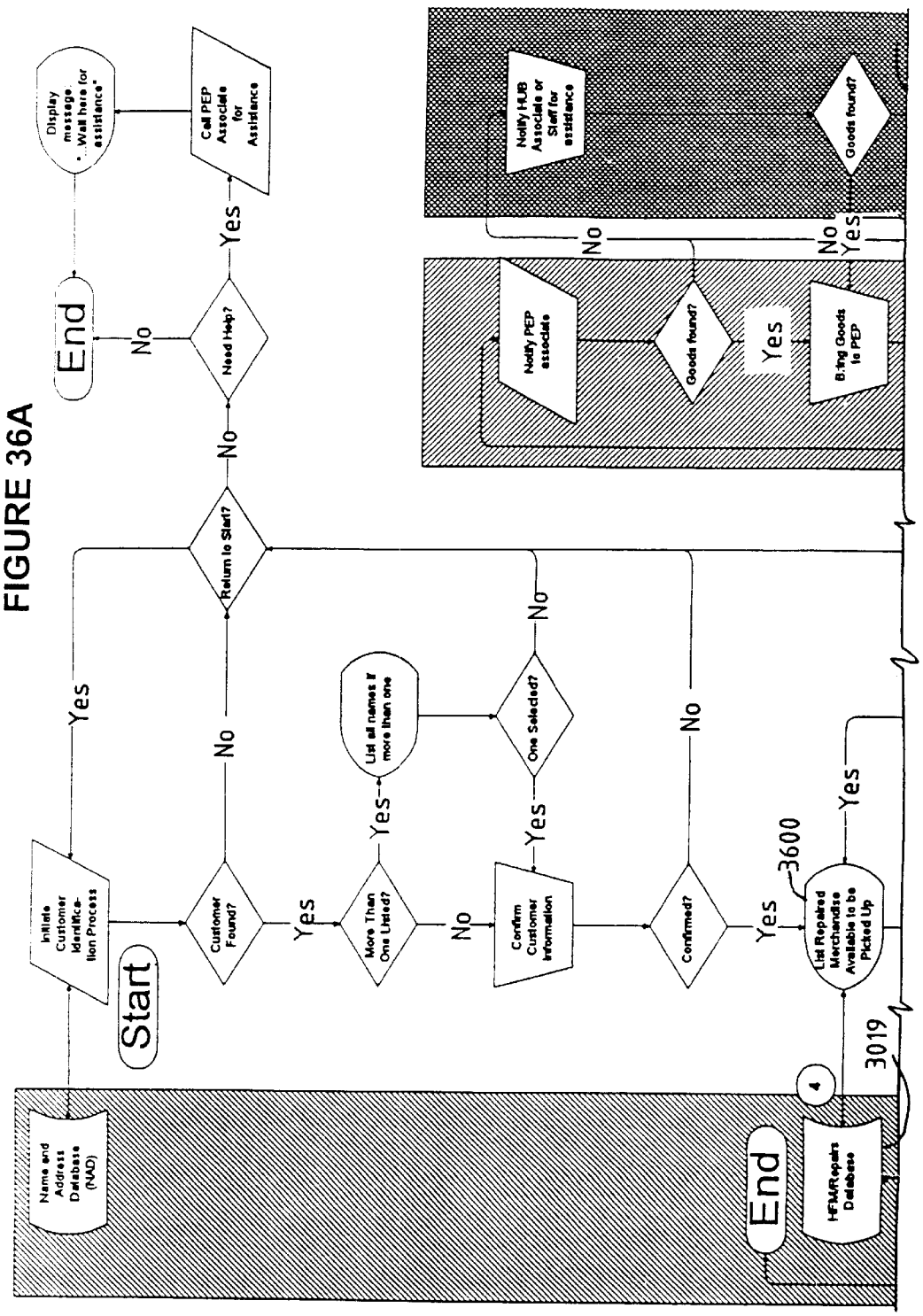
Figure 36B:
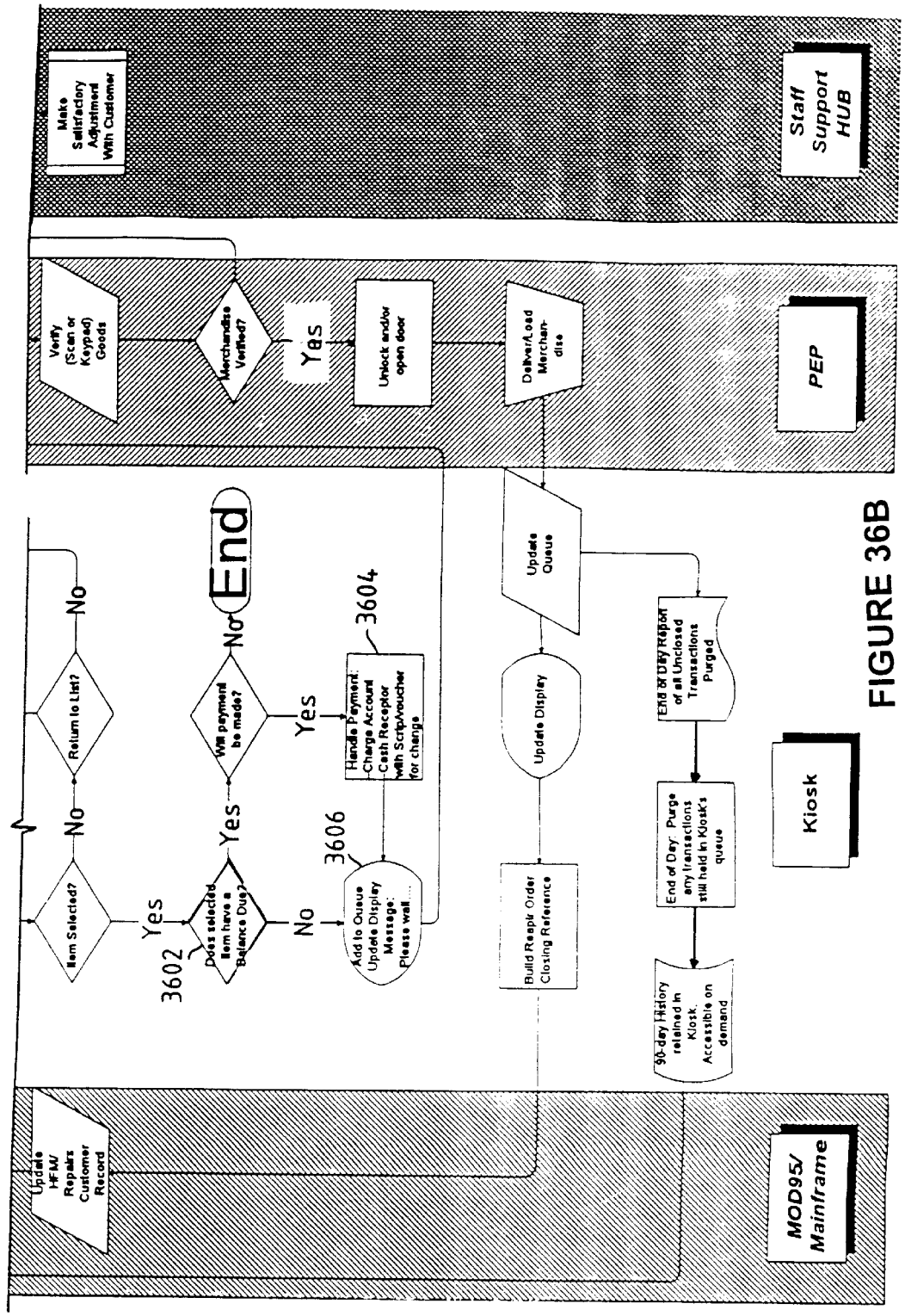

If a customer is picking up an item which has been repaired, the procedure shown in FIG. 36 is implemented. A repair pick up process is initiated by the customer touching the start area on the welcome screen displayed on the touch screen monitor 208 of the MPU kiosk 104. The customer then touches the Repair & Service button of the screen display 300, and the Repair PickUp button of the screen display 1700. The identification screen displays are presented to the customer and, if the customer confirms the identification information presented to the customer on the touch screen monitor 208, a block 3600 accesses the HFM database 3019 in order to present the customer with the screen display 2600. This screen display 2600 indicates to the customer the item which has been repaired and requests the customer to indicate whether the customer wishes to pick up this item by touching one of the displayed items.

If the customer does not select an item, the customer may either return to the list presented by the block 3600, or the customer may be returned to the welcome screen display, or the customer may ask for assistance. If an item is selected, a block 3602 determines whether the customer still owes the repair charge for the repaired item. If the customer still owes the repair charge but chooses not to make payment, the process ends. If the customer still owes the repair charge and chooses to make payment, a block 3604 presents the customer with the payment screen displays, including the screen displays 2300–2500, and processes these screen displays, as described above. After the customer pays for the repair by use of the screen displays according to the block 3604, or if a balance is not due for the repair as determined by the block 3604, a block 3606 presents the customer with a thank you screen display. This thank you screen display requests the customer to wait while an MPU associate is notified to deliver the repaired item to the customer. Also, a message is transmitted over the communication channel 102. This message causes the MPU associate to be notified by the paging system 116 and/or causes the work station 108 to display a suitable notice for the MPU associate. This message indicates the item to be picked up, identifies the transaction as a repair pick up, and identifies the customer.

If the repaired item is located by the MPU associate, or by a sales floor associate if the MPU associate cannot find the repaired item, the MPU associate scans the number off of the repair tag by use of the work station 108 which, if the information is verified by the work station 108, causes the door to the merchandise pick up area to be unlocked so that the MPU associate can deliver the repaired item to the customer. The customer display 110 is updated by moving the customer's name from the Waiting section to the Now-serving section of the customer display 110 and a message is sent to the in-store processor 112 so that the HFM database 3019 is updated.

Certain modifications of the present invention have been discussed above. Other modifications will occur to those practicing in the art of the present invention. For example, in various aspects of the present invention, an on-screen keyboard is presented to the customer which permits the customer to enter various data. However, an off-screen keyboard electrically connected to the computer of the MPU kiosk 104 may be used in place of, or in addition to, the on-screen keyboard. Moreover, an A-to-Z keyboard may by used for any of the QWERTY keyboards described above.

Also, as described above, the screen display 2400, and any related screen displays, are not presented to the customer for repairs made at a remote repair facility because such repairs are typically not covered by a warranty or a service contract. However, if repairs made at a remote repair facility are covered by a warranty or by a service contract, the screen display 2400, and any related screen displays, followed by the payment screen displays if necessary, can be presented to the customer at the time of drop-off.

Additionally, the kiosk 104, as described above, may be used by a customer to pick up an HFM item, to pick up or drop off a repair item, to return an item, and to pick up and drop off a loaner. The kiosk 104 may also be used by a customer to purchase items.

Moreover, the present invention has been described with particular reference to a retail sales establishment. However, as should be understood, the present invention may be used in any establishment which permits people to pick up items therefrom or to drop off items thereat.

Furthermore, the HFM database and the name and address database are described as being resident at or in the in-store processor 112. However, these databases could instead be stored in a memory of the MPU kiosk 104.

The communication channel 102 may be a plurality of conductors, a twisted pair of conductors, a coaxial conductor, one or more RF channels, one or more microwave channels, an optical fiber, and/or the like.

The phrase "drop off" is used herein to denote (i) the return of an item for a refund or an exchange, (ii) the drop off of a loaner, (iii) the drop off of an item to be repaired or serviced, and (iv) the like. The term "return" is used herein to denote primarily the return of an item for a refund or an exchange.

In addition, the layouts of the screen displays disclosed herein are intended to be exemplary only. Accordingly, any other layouts consistent with the claims hereof may be used.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. An item pick up system comprising:
   a communication channel;
   first means connected to the communication channel for issuing a check identifying a person who is to receive an item and identifying the item to be picked up by the person;
   second means connected to the communication channel and located remotely from the first means for identifying the person and item from the check and for transmitting a message identifying the person and the item; and,
   third means connected to the communication channel and located remotely from the first and second means for receiving the message from the second means and for providing an indication of the person and item in an item holding area.

2. The item pick up system of claim 1 wherein the first means includes means for notifying the third means if the item is to be picked up on a current day or a later day.

3. The item pick up system of claim 1 wherein the first means includes means for applying a code to the check.

4. The item pick up system of claim 3 wherein the second means includes means for reading the code on the check in order to identify (a) the person who is to receive the item and (b) the item to be picked up by the person.

5. The item pick up system of claim 1 wherein the second means includes means for responding to the person touching a display screen in order to identify (a) the person who is to receive the item and (b) the item to be picked up by the person.

6. The item pick up system of claim 1 wherein the second means includes means for responding to the person operating a keyboard in order to identify (a) the person who is to receive the item and (b) the item to be picked up by the person.

7. The item pick up system of claim 1 further comprising local displaying means for displaying an identification of the person and the position of the person in a queue, wherein the local displaying means is located in a position viewable by the person.

8. The item pick up system of claim 7 wherein the third means includes updating means for updating the local displaying means in order to update the position of the person in the queue.

9. The item pick up system of claim 1 wherein the third means includes remote displaying means for displaying the identification of the person and the item, wherein the remote displaying means is located so as to display the identification of the person and the item to an attendant in the item holding area.

10. The item pick up system of claim 9 further comprising local displaying means for displaying the identification of the person and the position of the person in a queue, and wherein the local displaying means is located in a position viewable by the person.

11. The item pick up system of claim 10 wherein the third means includes updating means for updating the local displaying means in order to update the position of the person in the queue.

12. The item pick up system of claim 9 wherein the remote displaying means comprises a portable display.

13. The item pick up system of claim 9 further comprising a paging system connected to the communication channel, wherein the paging system is arranged to receive the message, and wherein the paging system is arranged to transmit a notifying message to the third means.

14. The item pick up system of claim 13 wherein the third means comprises a portable display responsive to the notifying message for displaying the identification of the person and the item.

15. The item pick up system of claim 1 wherein the first means causes the item to be stored in a database so that the item is linked to the person, and wherein the second means retrieves the item from the database based upon the identification of the person and displays the item to the person.

16. An item pick up system comprising:
    a point-of-sale terminal located remotely from a stock room and a pick up area, wherein the point-of-sale terminal is arranged to process a point of sale transaction during which an item is purchased by a customer;
    a pick up terminal being located in the pick up area and outside the stock room, the pick up terminal being arranged to receive data directly from the customer, to identify the customer and the item from the data, and to transmit a message identifying the customer and the item; and,
    a stock room terminal coupled to the point-of-sale terminal and to the pick up terminal and being located in or near the stock room and outside the pick up area, the stock room terminal being arranged to notify, in response to the message, a stock room attendant in the stock room of the item and of the customer to be given the item.

17. The item pick up system of claim 16, wherein the point-of-sale terminal includes means for notifying the stock room terminal of the item to be picked up.

18. The item pick up system of claim 16 wherein the point-of-sale terminal is arranged to issue a check to the customer, wherein the point-of-sale terminal is arranged to code the check with an identification code unique to the customer, and wherein the pick up terminal includes means for reading the identification code on the check in order to identify (a) the customer who is to receive the item and (b) the item which is to be picked up by the customer.

19. The item pick up system of claim 16 wherein the pick up terminal includes means for responding to the customer touching a display screen in order to identify (a) the customer who is to receive the item and (b) the item which is to be picked up by the customer.

20. The item pick up system of claim 16 wherein the pick up terminal includes means for responding to the customer operating a keyboard in order to identify (a) the customer who is to receive the item and (b) the item which is to be picked up by the customer.

21. The item pick up system of claim 16 further including local displaying means for displaying an identification of the customer and the position of the customer in a queue, wherein the local displaying means is located in a position viewable by the customer.

22. The item pick up system of claim 21 wherein the stock room terminal includes updating means for updating the local displaying means in order to update the position of the customer in the queue.

23. The item pick up system of claim 16 further including remote displaying means for displaying the identification of the customer and the item, wherein the remote displaying means is located so as to display the identification of the customer and the item to a stock room attendant.

24. The item pick up system of claim 23 further comprising local displaying means for displaying the identification of the customer and the position of the customer in a queue, wherein the local displaying means of the pick up terminal is located in a position viewable by the customer.

25. The item pick up system of claim 24 wherein the stock room terminal includes updating means for updating the local displaying means in order to update the position of the customer in the queue.

26. The item pick up system of claim 23 wherein the remote displaying means comprises a portable display.

27. The item pick up system of claim 23 further comprising a paging system coupled to the pick up terminal and to the stock room terminal, wherein the paging system is arranged to receive the message from the pick up terminal, and wherein the paging system is arranged to transmit a notifying message to the stock room terminal.

28. The item pick up system of claim 27 wherein the stock room terminal comprises a portable display device responsive to the notifying message for displaying the identification of the person and the item.

29. The item pick up system of claim 16 wherein the point-of-sale terminal includes means for causing the item to be stored in a database so that the item is linked to the person, and wherein the pick up terminal retrieves the item from the database based upon the identification of the person and displays the item to the person.

30. An item processing kiosk comprising:
  customer identifying means for identifying a customer in response to data supplied directly by the customer;
  item identifying means for identifying an item from a database based upon the identification of the customer by customer identifying means, wherein the item is to be picked up by the customer;
  displaying means for displaying the identified item to the customer; and,
  message transmitting means for electronically transmitting a message in response to the customer identifying means and in response to the item identifying means, wherein the message provides a notification of the customer and the item.

31. The item processing kiosk of claim 30 wherein the database contains identifications of customers relating to open transactions.

32. The item processing kiosk of claim 30 wherein the customer identifying means includes means for reading a code in order to identify the customer who is to receive the item.

33. The item processing kiosk of claim 30 wherein the customer identifying means includes means for responding to the customer touching a display screen in order to identify the customer who is to receive the item.

34. The item processing kiosk of claim 30 wherein the customer identifying means includes means for responding to the customer operating a keyboard in order to identify the customer who is to receive the item.

35. The item processing kiosk of claim 30 further comprising displaying means responsive to the item processing kiosk for displaying an identification of the customer and the position of the customer in a queue.

36. The item processing kiosk of claim 35 wherein the displaying means includes means for changing a position of the customer in the queue.

37. The item processing kiosk of claim 30 wherein the message transmitting means transmits the message to a remote printer which prints the identification of the customer and the item.

38. The item processing kiosk of claim 30 wherein the message transmitting means transmits the message to a portable display device which displays the identification of the customer and the item.

39. The item processing kiosk of claim 30 wherein the item identifying means retrieves the item from the database based upon the identification of the customer.

40. An item processing method performed by a kiosk comprising the following steps:
  displaying selections allowing a customer to choose whether the customer is picking up an item, returning an item for exchange or refund, or dropping off an item for servicing;
  in response to the customer selecting one of the displayed selections, displaying a request for the customer to enter a customer and item identification; and,
  in response to the customer entering the customer and item identification, electronically transmitting a message, the message being arranged to provide a notification of the customer and the item, wherein the message designates whether an item is to be picked up, or returned, or dropped off.

41. The item processing method of claim 40 comprising the further step of storing identifications of customers relating to open transactions.

42. The item processing method of claim 40 wherein the step of displaying a request for the customer to enter a customer and item identification comprises the step of displaying a request for the customer to scan a code in order to identify (a) the customer who is to receive the item and (b) the item, which is to be picked up by the customer.

43. The item processing method of claim 40 wherein the step of displaying a request for the customer to enter a customer and item identification comprises the step of displaying a request for the customer to touch a display screen in order to identify (a) the customer who is to receive the item and (b) the item which is to be picked up by the customer.

44. The item processing method of claim 40 wherein the step of displaying a request for the customer to enter a customer and item identification comprises the step of displaying a request for the customer to manipulate a keyboard in order to identify (a) the customer who is to receive the item and (b) the item which is to be picked up by the customer.

45. The item processing method of claim 40 further comprising the step of displaying an identification of the customer and the position of the customer in a queue.

46. The item processing method of claim 45 wherein the step of displaying an identification of the customer and the position of the customer in a queue comprises the step of changing the position of the customer in the queue in response to an update message from a remote terminal.

47. The item processing method of claim 40 wherein the step of transmitting a message comprises the step of transmitting the message to a portable display device which displays the identification of the customer and the item.

48. The item processing method of claim 40 wherein the step of transmitting a message comprises the step of transmitting the message to a printer which prints the identification of the customer and the item.

49. The item processing method of claim 40 wherein the step of displaying a request for the customer to enter a customer and item identification comprises the step of retrieving the item from a database based upon the identification of the customer.

50. An item processing kiosk comprising:

identifying means for identifying, in response to data supplied directly by a customer, the customer and an item to be dropped off by the customer;

message transmitting means responsive to the identifying means for electronically transmitting a message to an item holding area in order to notify a holding area attendant of the identified item, wherein the message provides a notification to the holding area attendant of the customer and the item;

the identifying means comprising customer identifying means for identifying, in response to data supplied directly by the customer, the customer, and item identifying means for identifying the item from a database based upon the identification of the customer by the customer identifying means;

the database containing identifications of items linked to customers with respect to past transactions, and wherein the item identified by the item identifying means is from the database.

51. An item processing kiosk comprising:

identifying means for identifying, in response to data supplied directly by a customer, the customer and an item to be dropped off by the customer;

message transmitting means, responsive to the identifying means, for electronically transmitting a message to an item holding area in order to notify a holding area attendant of the identified item, wherein the message provides a notification to the holding area attendant of the customer and the item;

displaying means responsive to the item processing kiosk for displaying an identification of the customer and the position of the customer in a queue.

52. The item processing kiosk of claim 51 wherein the displaying means includes means for changing a position of the customer in the queue.

* * * * *